United States Patent
Brassard et al.

(10) Patent No.: US 10,921,579 B2
(45) Date of Patent: Feb. 16, 2021

(54) DYNAMIC SECURITY DEVICE

(71) Applicants: NATIONAL RESEARCH COUNCIL OF CANADA, Ottawa (CA); BANK OF CANADA, Ottawa (CA)

(72) Inventors: Daniel Brassard, Longueuil (CA); Lidija Malic, Montreal (CA); Keith J. Morton, St-Bruno-de-Montarville (CA); Teodor Veres, Montreal (CA); Charles D. MacPherson, Santa Barbara, CA (US); Theodoros Garanzotis, Ottawa (CA)

(73) Assignees: National Research Council of Canada, Ottawa (CA); Bank of Canada, Ottawa (CA)

( * ) Notice: Subject to any disclaimer, the term of this patent is extended or adjusted under 35 U.S.C. 154(b) by 95 days.

(21) Appl. No.: 15/539,488

(22) PCT Filed: Dec. 23, 2015

(86) PCT No.: PCT/IB2015/059968
§ 371 (c)(1),
(2) Date: Jun. 23, 2017

(87) PCT Pub. No.: WO2016/103225
PCT Pub. Date: Jun. 30, 2016

(65) Prior Publication Data
US 2017/0368865 A1 Dec. 28, 2017

Related U.S. Application Data

(60) Provisional application No. 62/096,695, filed on Dec. 24, 2014, provisional application No. 62/096,700, filed on Dec. 24, 2014.

(51) Int. Cl.
*G02B 26/00* (2006.01)
*G02B 26/02* (2006.01)
(Continued)

(52) U.S. Cl.
CPC ......... *G02B 26/026* (2013.01); *B42D 25/29* (2014.10); *B42D 25/36* (2014.10); *B42D 25/405* (2014.10);
(Continued)

(58) Field of Classification Search
CPC .... G02B 26/004; G02B 26/005; G02B 1/005; G02B 2207/101; G02B 26/026;
(Continued)

(56) References Cited

U.S. PATENT DOCUMENTS

| 4,126,854 | A | 11/1978 | Sheridon |
| 5,389,945 | A | 2/1995 | Sheridon |

(Continued)

FOREIGN PATENT DOCUMENTS

| CA | 2714639 A1 | 8/2009 |
| CN | 101977778 A | 2/2011 |

(Continued)

OTHER PUBLICATIONS

Campbell, Andrew I. et al—"Gravitaxis in Spherical Janus Swimming Devices"; ACS Publications, Langmuir 2013, 29 pp. 14066-14073.

(Continued)

*Primary Examiner* — Brandi N Thomas
(74) *Attorney, Agent, or Firm* — Aventum IP Law LLP

(57) ABSTRACT

A security device that elicits at least one dynamic response upon acceleration, or upon change of orientation with respect to gravity, wherein the dynamic response continues after cessation of the acceleration or the change of orientation. In addition, the dynamic response can be optical, such that it is visually observable by an unaided human eye. Alternatively, the response can be machine readable. In some cases, the dynamic response has duration of from about 0.01 s to about 100 s, or from about 1s to about 10 s.

18 Claims, 19 Drawing Sheets

(51) Int. Cl.

| | | |
|---|---|---|
| *G02B 1/00* | (2006.01) | |
| *B42D 25/405* | (2014.01) | |
| *B42D 25/29* | (2014.01) | |
| *B82Y 20/00* | (2011.01) | |
| *B82B 1/00* | (2006.01) | |
| *B42D 25/36* | (2014.01) | |
| *G02F 1/01* | (2006.01) | |
| *G06Q 30/00* | (2012.01) | |
| *G02F 1/17* | (2019.01) | |

(52) U.S. Cl.
CPC ............ *B82B 1/003* (2013.01); *B82Y 20/00* (2013.01); *G02B 1/005* (2013.01); *G02F 1/0128* (2013.01); *G06Q 30/0185* (2013.01); *G02B 2207/101* (2013.01); *G02F 1/172* (2013.01); *G02F 2201/38* (2013.01)

(58) Field of Classification Search
CPC ........ G02F 1/0128; G02F 1/167; G02F 1/172; G02F 2201/38
USPC ................ 359/237, 242, 265–267, 273–275, 359/290–292, 295, 296, 298
See application file for complete search history.

(56) References Cited

U.S. PATENT DOCUMENTS

| | | | |
|---|---|---|---|
| 5,808,783 | A | 9/1998 | Crowley |
| 6,197,228 | B1 | 3/2001 | Sheridon |
| 6,445,490 | B1 | 9/2002 | Chopra et al. |
| 6,980,352 | B1 | 12/2005 | Tam |
| 7,871,741 | B2 | 1/2011 | Nemeth et al. |
| 8,068,271 | B2 | 11/2011 | Lipovetskaya et al. |
| 8,324,625 | B2 | 12/2012 | Aburaya et al. |
| 2006/0176438 | A1* | 8/2006 | Sage .................... G02B 26/026 349/182 |
| 2007/0189944 | A1* | 8/2007 | Kirkland ............ B01J 20/28004 423/118.1 |
| 2009/0162625 | A1 | 6/2009 | Takeuchi et al. |
| 2013/0017948 | A1 | 1/2013 | Charlson et al. |
| 2014/0239628 | A1* | 8/2014 | MacPherson .......... B82Y 20/00 283/67 |
| 2015/0151562 | A1 | 6/2015 | Whiteman et al. |

FOREIGN PATENT DOCUMENTS

| | | |
|---|---|---|
| DE | 102011108477 A1 | 1/2013 |
| EP | 0 721 176 A2 | 7/1996 |
| JP | 2004-325738 A | 11/2004 |
| WO | 2009/048532 A2 | 4/2009 |
| WO | 2009074284 A3 | 6/2009 |
| WO | 2009/100874 A2 | 8/2009 |
| WO | 2009100874 A3 | 8/2009 |
| WO | 2010139427 A1 | 12/2010 |
| WO | 2011050105 A1 | 4/2011 |
| WO | 2013/040703 A1 | 3/2013 |
| WO | 2013040704 A1 | 3/2013 |
| WO | 2015066810 A1 | 5/2015 |
| WO | 2015144511 A1 | 10/2015 |

OTHER PUBLICATIONS

Wolff, Katrin et al—"Sedimentation and orientational order of active bottom-heavy particles"; EPJ Draft—Institut für Theoretische Physik, Feb 2013—pp. 1-6.
Hu, Jing et al—"Fabrication, properties and applications of Janus particles"; Chem. Soc. Rev., 2012,41—pp. 4356-4378.
Perro, Adeline et al—"Design and synthesis of Janus micro- and nanoparticles"; The Royal Society of Chemistry 2005; Journal of Materials Chemistry, 2005, 15, pp. 3745-3760.
Sheridon, N.K., et al—"The Gyricon rotating ball display"; Journal of the SID 7/2, 1999—pp. 141-144.
Walther, Andreas et al—"Janus Particles: Synthesis, Self-Assembly, Physical Properties, and Applications"—ACS Publications; Chem Rev. 2013, 113—pp. 5194-5261.
Colour Change—De La Rue—"http://www.delarue.com/markets/central-banks-currency/security-features-for-the-public/colour-change.aspx"—Mar. 2015—pp. 1-6.
Tilt Security Features—Reserve Bank "http://banknotes.resbank.co.za/mobi/Security.html"—Mar. 2015—pp. 1-7.

\* cited by examiner

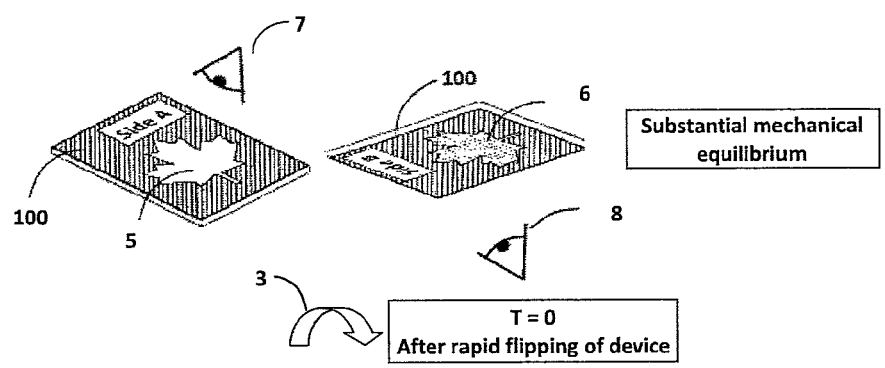
FIG. 4A
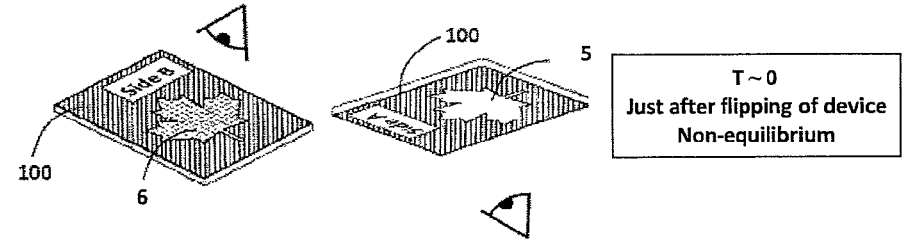
FIG. 4B
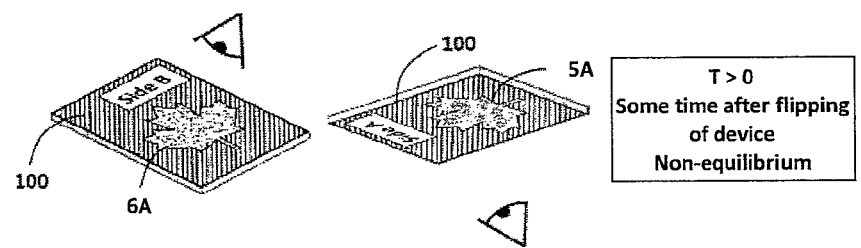
FIG. 4C
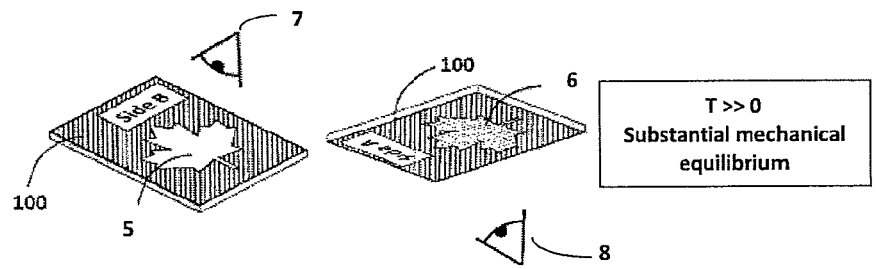
FIG. 4D
FIG. 4

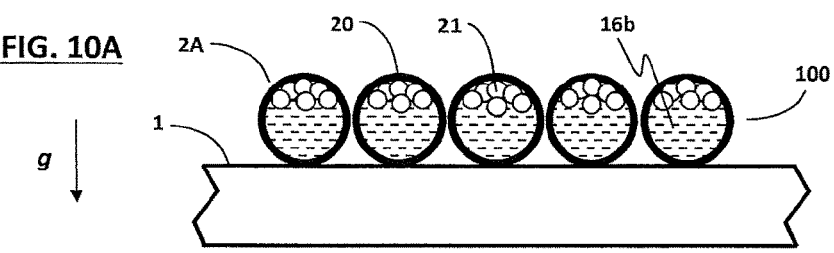
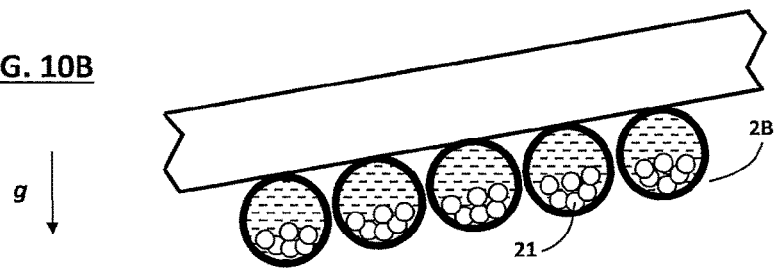
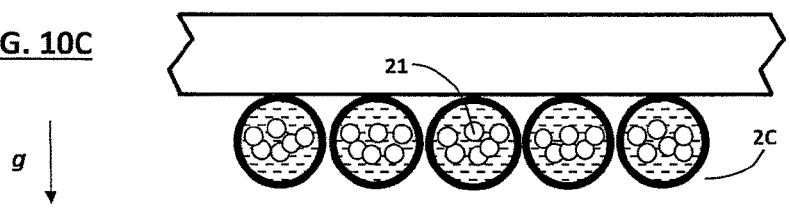
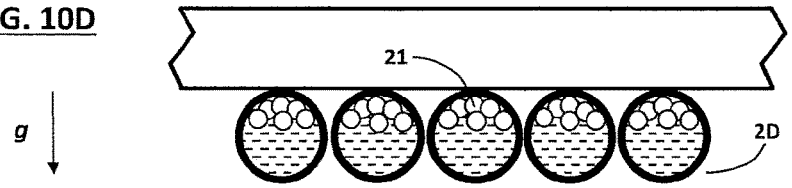
FIG. 10

FIG. 18A
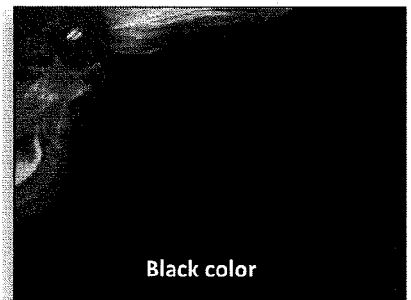
FIG. 18B
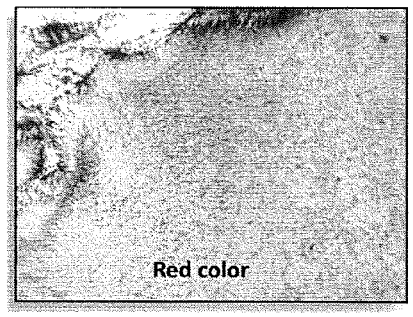
FIG. 18C
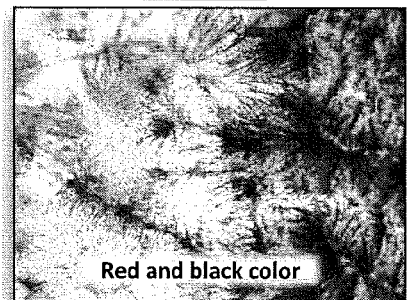
FIG. 18D
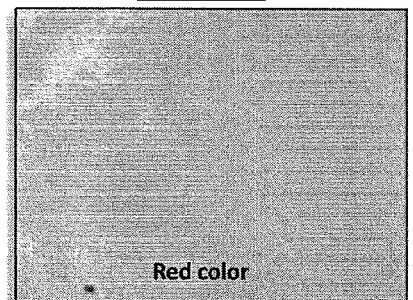
FIG. 18

DYNAMIC SECURITY DEVICE

The present invention relates to the field of a security device. In particular, it relates to a dynamic security device based on response to acceleration.

Security devices (or features) that provide a high degree of protection against counterfeiting are essential to ensure confidence in the authenticity of security documents used for financial transactions or personal identification. Various types of security devices have been developed and integrated into security documents such as bank notes, coins, passports, identity documents, ID cards and credit cards. Some security devices are either kept secret or require the use of machines to be properly identified. While effective for official authentication by authorities, such high-level security devices cannot be easily used by the general public to assess the validity of a document. Security devices designed to be used by the general public (i.e. "Level 1" security devices) are thus also integrated into security documents to prevent the use of counterfeited documents during transactions between individuals. Level 1 security devices are essential for providing a high degree of confidence to the general public and prevent widespread distribution of counterfeited documents before they are tested by official agencies and removed from circulation.

Bank notes and other security documents often integrate Level 1 security devices to provide secure authentication by the general public. For example, the most basic Level 1 security devices available on bank notes can include substrate specific tactility, ink relief associated with intaglio printing, watermarks, presence of transparent windows, see-through registration devices, and micro printing. These are, however, typically not considered sufficient to provide a high degree of counterfeiting resistance for high security documents such as modern bank notes. Many bank notes, passports and secured ID cards now also integrate optically variable security devices. Optically variable devices (OVD) provide an additional layer of security compared to more conventional secured printing technologies, such as micro printing or intaglio printing, as the optical effects that they exhibit cannot be replicated by conventional scanner and printing technologies. OVD known in the art include: gratings, holograms, colour shifting foils, optically variable inks, plasmon-based devices, and diffractive optical elements.

The integration of OVD into security documents is motivated by increased mainstream availability of low-cost copying, imaging and printing technologies. While OVD can provide many advantages as a Level 1 security device compared to traditional security printing, the counterfeiting resistance of many OVD known in the art can sometimes be challenged by deceptively simple schemes. For example, the counterfeiting of devices such as gratings, holograms and colour shifting foils is facilitated by the increased availability of low-cost metalized gratings found in some paper wrap and commercial packaging. While counterfeited devices made using these simple gratings may not achieve the same degree of complexity as those available on the current security documents, they may provide diffractive colours and optically variable effects that are close enough to those of the original document to potentially fool the general public. Indeed, due to the limited awareness of the general public to the details of a security device, the effectiveness and counterfeiting resistance of a Level 1 security device may be degraded as soon as visually similar effects are widely available to counterfeiters. Another limitation is due to the fact that many OVD known in the art share a similar type of visual effect, where the optical variations are obtained by changing the angle of observation or lightning conditions. This similarity between many OVD may fool the public to accept a counterfeited document simply because a change in the angle of observation creates optically variables effects. It may also make it more difficult for the public to distinguish between a novel and traditional OVD, potentially reducing the effectiveness of the novel security devices.

Other types of security devices known in the art can also present limitations. For example, diffractive optical elements are Level 1 security devices commonly used on bank notes that involve the patterning of an array of microscopic devices to create transmitted diffracted images or holograms. Such diffractive optical elements require specific lighting conditions to be visible, for example a small point light source with a dark background. Such lighting conditions might not always be available to assess the validity of the device. Also, the procedure to test the validity of the device might not necessarily be obvious to the general public, thus requiring education campaigns to ensure effectiveness of the device as a Level 1 security device.

The integration of more advanced visual effects on security documents is a key element that can help to increase the awareness of the general public to Level 1 security devices, thus improving counterfeiting resistance. Introducing a truly dynamic or active visual effect (i.e. an effect that is observable during and after action by the external force) on to a security document such as a bank note is a challenging task.

WO 2013/040703 A1 discloses an optically based authentication device that attaches to a security document having a substrate. The authentication device includes a piezoelectric material layer for generating an electric field in response to mechanical stress; and an optically responsive layer directly attached to the piezoelectric material layer. In response to the electric field generated by the piezoelectric material layer, the optically responsive layer changes between a first state and a second state having different ocular perceptions.

WO 2013/040704 A1 discloses security devices that include a fluid or fluids that provide techniques to check whether a security document is a legitimate or counterfeit copy.

DE 102011108477A1 discloses a security element with a substrate having a window and a hollow chamber, which is filled with a filler material with security features. The filler material comprises an embedding matrix. In addition, the window includes spacers.

CA 2,714,639 (published Aug. 20, 2009) discloses a security element that comprises a substrate with a multitude of particles. The particles represent at least two distinguishable information states. The security element changes reversibly between the information states while the particles remain wholly aligned with gravity, and as such, act like miniature gyroscopes.

One possible approach to create dynamic or active visual effects is the use of Janus microparticles. Examples of Janus microparticles include microscopic particles that have at least two different types of physical properties on their surface. Janus microparticles have been used in fields such as electronic-paper displays, biomedical applications, self-propulsion, and in the creation of self-assembled structures. Of particular interest in the field of security devices is the use of Janus microparticles in displays and electronic paper. For example, U.S. Pat. Nos. 8,068,271 B2; 6,980,352; 6,197,228; 5,808,783; 6,445,490 B1; and 5,389,945 all teach how bichromic spherical particles have been used to create active displays by rotating Janus microparticles by the application of an electric or magnetic field. The effect of gravitation or acceleration would typically be considered detrimental for displays and e-paper applications as it can deteriorate an image initially created by electrical or magnetic forces. Also, as the bichromic balls used for the fabrication of the disclosed Gyricon displays are typically made from white and black wax, the density of such Janus microparticles is fairly uniform, thus limiting the possibility to create changes in orientation arising from gravitation or acceleration. Finally, the size of the Janus microparticles used in such displays (typically 30-300 μm) are not be compatible with many security-related applications where the devices must have a thin profile, preferably smaller than 10 μm.

In general, there is a continuing need to improve and develop Level 1 security devices to keep up with the technological innovations available to counterfeiters. Of particular interests are the devices that are not only counterfeit-resistant, but can also be clearly distinguished from previous generation of security devices by the general public. Also, the development of an active or dynamic security device with a thin design profile, that is durable, doesn't require powering of the device, has a scalable manufacturing route, can be applied to the security document with existing equipment and is highly overt, intuitive and can be activated with little interaction by the public would represent a major breakthrough in document security.

SUMMARY

The security device in its general form will first be described, and then its implementation in terms of embodiments will be detailed hereafter. These embodiments are intended to demonstrate the principles of the security device, and the manner of implementation. The security device in the broadest and more specific forms will then be further described, and defined, in each of the individual claims which conclude this specification.

Disclosed herein is a security device that can create dynamic effects based on variations in the acceleration or orientation of the device. In particular, security devices are fabricated that can show dynamic effects triggered by the relative orientation of a security document compared to the gravitational field. In one embodiment, the disclosed security device can be used to create dynamic visual changes when a document is rotated (about an axis that is not aligned with gravitational field) to obtain a Level 1 security device that can be easily recognized by the general public. The speed of the dynamic visual effects can also be adjusted so that visible changes persist for some time after manipulation of the document.

In contrast to most Level 1 OVD known in the art, the security device can be used to create overt dynamic visual changes that persist after manipulation, even in the absence of change in the relative angle of observation. The dynamic visual effects that can be generated by the disclosed security devices differ from the effects typically achieved with conventional OVD known in the art. These overt differences can prevent several types of counterfeiting attempts that can be problematic for a wide range of traditional OVD.

Additionally, the security device can be made such that no external equipment is required to generate the effect and, as the effect does not rely on diffraction, its visualization is possible under most lighting conditions (i.e. no need for specular reflected light or point light sources). Furthermore, as the normal manipulation of security documents typically involves changes in their orientation, dynamics effects can be naturally created during the transactions. The developed security devices can thus provide a tool to assess the validity of a document without requiring the end user to perform specific actions or tests.

For example, the authentication of a document may be achieved by simply observing the visual dynamic changes that occur both during and for a few seconds after turning the document upside down. A Level 1 dynamic security device has thus been developed that is powered by gravitational or acceleration forces and thus requires no power source or electrodes to be applied to the bank note.

In one aspect of the present invention, there is disclosed a security device that elicits at least one dynamic response upon acceleration, or upon change of orientation with respect to gravity, wherein the dynamic response continues after cessation of the acceleration or the change of orientation. The dynamic response can have duration of about 0.01 s to about 100 s, or from about 1 s to about 10 s. The acceleration can include vibration and/or shaking of the security device. In one embodiment, the security device elicits more than one dynamic response.

The security device may comprise a plurality of microscopic elements; while the dynamic response can comprise a transition of the microscopic elements from substantial mechanical equilibrium to non-equilibrium upon action of the acceleration or change of orientation; and back to substantial mechanical equilibrium after cessation of the acceleration or change of orientation. The transition of the microscopic elements leads to the generation of one or more macroscopic effects, at least one of which is optical or machine-readable. Where the macroscopic effect is optical, it can be visually observable by an unaided human eye. In addition, the microscopic elements can transition by way of rotation, sedimentation or flotation of the element; displacement within the element; or any combination thereof. The plurality of the microscopic elements may transition in a time interval of from about 0.01 s to about 100 s, or from about 1 s to about 10 s, or to about 10 s, or to about 5 s.

In some instances, translational or rotational Brownian motion of the microscopic elements is negligible compared to gravitational convective forces acting on the microscopic elements. In some other instances, translational or rotational Brownian motion of the microscopic elements is large compared to the gravitational force (of 1G). In this case, a response can be elicited by applying an acceleration field that is, for example, greater than gravitational field, to temporarily increase the degree of alignment, sedimentation or flotation of the microscopic elements. Upon cessation of the applied acceleration, the translational or rotational Brownian motion of the microscopic elements dominates again, giving rise to a dynamic response following the disruption of the alignment, sedimentation or flotation of the microscopic elements created by the applied acceleration.

The microscopic elements that make up part of the security device have a number of characteristics. For example, these can range in size between 0.01 and 100 microns, or between 0.01 and 10 microns.

Furthermore, the microscopic elements can be integrated into one or more microchannels, which can be dependent or independent. Each microchannel may have a height of between 0.1 and 1000 microns.

In one embodiment, the microscopic elements are dispersed in fluid. Furthermore, a portion or all of the microscopic elements each have a centre of mass that is distinct from the centre of volume. In such an embodiment, the microscopic elements transition by way of rotation. As an example, the microscopic element can be a Janus microparticle that comprises an inner core; and a coating on a surface portion of the Janus particle, where the inner core has a density distinct from the density of the coating. The inner core may have a diameter of from 0.1 to 100 microns (μm), while the coating can have a thickness of from 10 nm to 500 nm, where the coating thickness is less than 20% of the diameter. The inner core may be solid. The coating may include an anti-reflective surface, such as a coating that comprises chromium, gold and silicon dioxide. One example of such an anti-reflective coating is a first layer of chromium on the surface portion of the inner core; a second layer of gold; a third layer of chromium; a fourth layer of silicon dioxide; a fifth layer of chromium and a sixth layer of silicon dioxide. Another example of a coating is one that comprises a thin film, a dye or a colorant. The thin film can comprise a first layer of one or more metal films, a second layer of a first dielectric film, a third layer of one or more metal films, and a fourth layer of a second dielectric film.

In another embodiment, the microscopic elements are dispersed in fluid. Furthermore, a portion or all of the microscopic elements have an average density that is unequal with a density of the fluid. In such an embodiment, the microscopic elements transition by way of sedimentation or flotation. Here, the fluid may comprise a dye that contrasts with the microscopic elements as they transition.

In the above embodiments, the rotation, sedimentation or flotation of the microscopic elements can deviate light to change, reveal or magnify one or more static printed features patterned on the elements. Furthermore, the microscopic elements and fluid can be integrated into one or more microcapsules having a diameter of between 0.1 and 200 microns.

In yet another embodiment, the microscopic element may comprise a microcapsule that encapsulates two or more immiscible fluids of unequal density. In such an embodiment, the microscopic elements transition by way of displacement of the fluids within the element. The microcapsule can range in size between 0.1 and 200 microns. As an example, each microcapsule can include two liquids. One way to facilitate displacement of the liquids is to have one liquid with a contact angle higher than 140 degrees with the microcapsule, while the other liquid has a contact angle lower than 40 degrees with the microcapsule. Another example includes a microcapsule with a first, second and third fluid; in which the first fluid wets an inner surface of the microcapsule, and the second and third fluids are encapsulated by the first fluid.

In the various embodiments described above, the microcapsule and/or fluid can deviate light to create a lens effect.

The microscopic elements used in the device may be deposited, printed, attached or added onto or into a substrate.

It is also possible to disperse the microscopic elements in a liquid matrix that is solidified; and expose the solidified matrix to a swelling agent that provides a liquid shell around the microscopic elements. The liquid matrix can be solidified by curing or solvent evaporation.

In the security device, different types of microscopic elements can be used to provide one or more dynamic responses.

In another aspect of the present invention, there is provided a security device that comprises a plurality of microscopic elements dispersed in a fluid; and elicits at least one dynamic response upon acceleration, or upon change of orientation with respect to gravity, wherein an average density of each microscopic element is distinct from an average density of the fluid, and the dynamic response includes a transition of the microscopic elements by way of sedimentation or flotation: from substantial mechanical equilibrium to non-equilibrium upon action of the acceleration or change of orientation; and back to substantial mechanical equilibrium after cessation of the acceleration or change of orientation.

The transition of the microscopic elements leads to the generation of one or more macroscopic effects, at least one of which is optical or machine-readable. Where the macroscopic effect is optical, it can be visually observable by an unaided human eye. The plurality of the microscopic elements may transition in a time interval of from about 0.01 s to about 100 s, or from about 1 s to about 10 s, or to about 10 s. In one example, when the device is shaken and/or vibrated, a portion or all of the microscopic elements transition from adhesion onto a wall of the device, to dispersion in a fluid by way of sedimentation or flotation. In further embodiments, the security device may comprise a first set of microscopic elements each with an average density greater than the fluid density that transition by way of sedimentation; and a second set of microscopic elements each with an average density less than the fluid density that transition by way of flotation. The fluid in the device may comprise a dye that contrasts with the microscopic elements as they transition by way of sedimentation or flotation.

In yet another aspect of the present invention, there is provided a security device that comprises a plurality of microscopic elements dispersed in a fluid; and elicits at least one dynamic response upon change of orientation with respect to gravity, wherein each microscopic element comprises two or more immiscible fluids enclosed within a microcapsule, and the dynamic response includes a transition of the microscopic elements by way of displacement of two immiscible fluids within the microcapsule: from substantial mechanical equilibrium to non-equilibrium upon the change of orientation; and back to substantial mechanical equilibrium after cessation the change of orientation.

The transition of the microscopic elements leads to the generation of one or more macroscopic effects, at least one of which is optical or machine-readable. Where the macroscopic effect is optical, it can be visually observable by an unaided human eye. The plurality of the microscopic elements may transition in a time interval of from about 0.01 s to about 100 s, or from about 1 s to about 10 s, or to about 10 s. The microcapsule can have a diameter of between 0.1 and 200 microns. In one example, each microcapsule may comprise two liquids. To facilitate the displacement of the two liquids, one liquid may have a contact angle higher than 140 degrees with the microcapsule, while the other liquid can have a contact angle lower than 40 degrees with the microcapsule. In another example, each microcapsule comprise a first, second and third fluid; the first fluid wets an inner surface of the microcapsule; the second and third fluids are encapsulated by the first fluid; and the second and third fluids are displaced during the dynamic response.

In yet another aspect of the present invention, there is provided a security device that comprises a plurality of microscopic elements configured to transition from substantial alignment to non-alignment with the gravitational field upon action of acceleration or a change of orientation of the device, and back to substantial alignment with the gravitational field after cessation of the acceleration or change of orientation. The transition produces one or more macroscopic effects. At least one of these macroscopic effects may be optical.

In yet a further aspect of the present invention, there is provided a security device that comprises a plurality of microscopic elements; and elicits at least one dynamic response upon acceleration, or upon change of orientation with respect to gravity, wherein the dynamic response includes a transition of the microscopic elements: from substantial mechanical equilibrium to non-equilibrium upon acceleration or change of orientation; and back to substantial mechanical equilibrium after cessation of the acceleration or change of orientation.

The foregoing summarizes the principal features of the security device and some optional aspects thereof. The security device may be further understood by the description of the embodiments which follow.

Wherever ranges of values are referenced within this specification, sub-ranges therein are intended to be included within the scope of the security device unless otherwise indicated. Where characteristics are attributed to one or another variant of the security device unless otherwise indicated, such characteristics are intended to apply to all other variants where such characteristics are appropriate or compatible with such other variants.

BRIEF DESCRIPTION OF FIGURES

FIGS. 4A-4D illustrates an example of a visual effect that results from the flipping/rotating the security device.

FIG. 10 illustrates another embodiment of the security device based on generation of dynamic visual effects by the flotation of microscopic elements incorporated into capsules.

FIGS. 18A-18D illustrate a dynamic response obtained by flipping another embodiment of a security device consisting of a container filled with an aqueous solution of Janus microparticles.

DEFINITIONS

Figure 1:
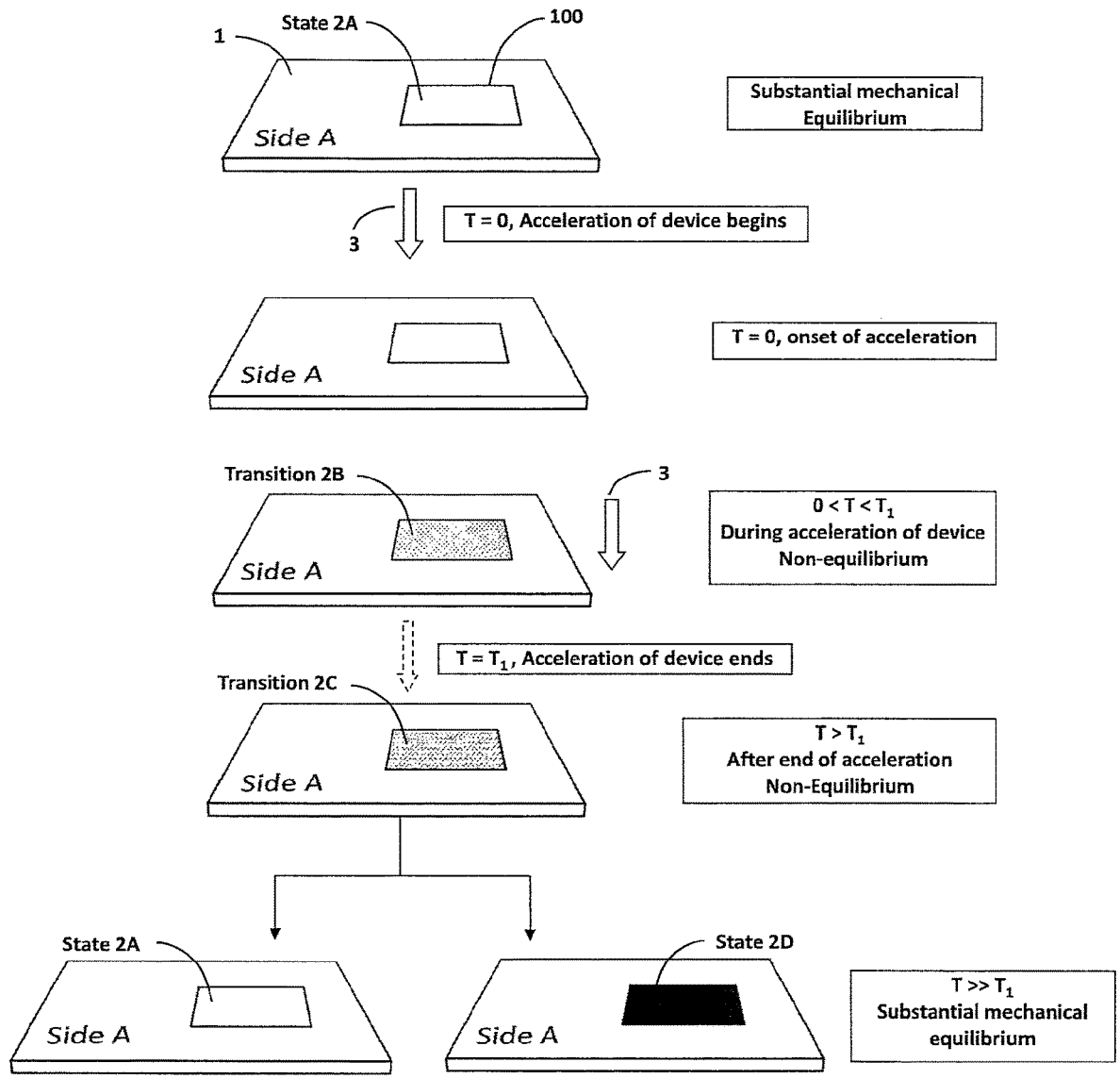
FIG. 1 illustrates the general concept of the dynamic transition of a security device in response to a change in the acceleration of the device.

Microparticles: particles having characteristic dimensions in the micrometer range, typically in the range of 0.01-500 microns (μm). Microparticles can be fabricated from a wide variety of one or more materials including the following non-limiting examples: polymers, metals, ceramics, glass, porous materials, foams, composites, magnetic materials. They can have various shapes, including the following non-limiting examples: sphere, oval, quasi-sphere, disk, cylinder, cubic, prism, pyramid, flakes, or hollow, porous, rough or complex shapes.

Janus microparticles: microparticles having at least two distinct physical and/or chemical properties.

Microscopic element: an element of the security device having dimensions in the micrometer range, typically in the range of 0.01-500 microns. Non-limiting examples of microscopic elements include microparticles, microcapsules, hollow microcapsules, Janus microparticles, flakes.

Substrate: material supporting the security device. For example, the substrate typically refers to the material (e.g. plastic, paper) of a security document used to support the security device. Substrate can also refer to the carrier material (e.g. PET foil) used during the fabrication of the security device before transfer to the security device.

Acceleration: the rate at which the velocity of an object changes with time. Acceleration results of the sum of all forces acting on the object according to Newton's Second Law. Acceleration is a vector quantity that includes both a magnitude and a direction and is described by unit of length divided by time squared (e.g. $m/s^2$). The term acceleration may refer to any of the items in the following non-limiting list: deceleration, linear acceleration, non-linear acceleration, uniform or constant acceleration, non-uniform acceleration, gravitational acceleration, inertial acceleration, centrifugal acceleration, centripetal acceleration, tangential acceleration, and angular acceleration. With respect to a security device, an event is said to occur upon acceleration when an external event, action, influence or force creates acceleration or changes the magnitude or orientation of acceleration. The external event, action or force can include the following non-limiting examples: shaking, vibrating, throwing, tilting, rotating, centrifuging, manipulating, pulling, pushing, jumping or falling. The cessation of acceleration indicates the end of the external event, action or force creating acceleration or the change in the magnitude or orientation of acceleration. In this context, it is understood that acceleration can be said to cease even if gravitation, other types of constant accelerations or negligible accelerations are still present.

Gravitational acceleration, gravitational acceleration field: the acceleration of an object caused by gravitational force. Gravitational acceleration is a vector quantity and is described by unit of length divided by time squared (e.g. $m/s^2$). On Earth, gravitational acceleration takes a value of approximately 9.8 $m/s^2$.

Fluid: pertains to a substance that continuously deforms and flows under the application of shear. Fluids typically refer to a liquid, a gas, a mixture, a solution, a dispersion, a suspension, a colloid, an emulsion, or a gel. Non exhaustive examples of fluids include: aqueous solutions, fluorinated oils, hydrofluoroether, glycol derivatives, ionic liquids, silicone oils, perfluorocarbon fluids, perfluoropolyether fluids, ethylene dibromide, methylene dibromide, sodium polytungstate, methylene iodide, isopar, a ferrofluid, uncured UV resin, and mixtures thereof. In addition, the fluid may include a surfactant, a stabilizer a dispersion agent, an emulsifier, a charge control agent, an anti-static agent, a dye, a colorant, or a pigment. Non-exhaustive examples of surfactants include poloxamer, polysorbate detergent, sodium dodecyl sulfate, sorbitan oleate, perfluoropolyether lubricant and any combination thereof. As an example, the viscosity of the fluid can be used to control the displacement, rotation and sedimentation/flotation speed of microscopic elements used in the security device.

Sedimentation: the downward displacement or falling of microscopic elements in a fluid, in response to a force acting on the microscopic elements. Sedimentation can refer herein to settling, dropping, or downward motion of the microscopic elements. The term sedimentation is used herein both (i) for particles in suspension in a fluid that settles on a solid surface and (ii) for particles that were previously settled on a solid surface before initiating their motion in the fluid.

Flotation: the upward displacement or rising of microscopic elements in a fluid, in response to a force acting on the microscopic elements. The term flotation is used herein both (i) for microscopic elements in suspension in a fluid that rises towards a solid surface, and (ii) for particles that were previously settled on a solid surface before initiating their motion in the fluid.

Mechanical equilibrium, substantial mechanical equilibrium: a stable or quasi-stable state of matter in which the forces on microscopic elements are such that no perceptible change occurs with time, or where a configuration of steady state, dynamic equilibrium, or quasi-dynamic equilibrium is reached. In this context, it is understood that the system can be considered in mechanical equilibrium even in the presence of Brownian motion, steady state diffusion, gravitation, or negligible forces.

Mechanical non-equilibrium, non-equilibrium: a state of matter in which the forces are such that perceptible changes, displacement, rotation, or sedimentation occur with time. For example, mechanical non-equilibrium can occur both during and after the application of a significant mechanical force. The presence of Brownian motion, steady state diffusion, gravitation, or negligible forces does not necessarily place the system in mechanical non-equilibrium.

Dynamic response: a response that elicits at least one detectable change occurring continuously with time. For example, a dynamic response may be overt or covert. It can include a continuous optical change, that may be observable unaided by the human eye.

Security device, security feature or security element: any device, feature, or element that can be added to a document to prevent counterfeiting or make the document more difficult to copy or replicate. In one embodiment, the security device, security feature or security element can be made to have a thin profile to avoid protruding significantly from the document. For example, the thickness of the security device, security feature or security element can be in the 0.1-20 μm or in the 1-10 μm range.

Macroscopic effect: a collective modification or response generated by combining individual modifications, responses, displacements or rotations of a plurality of microscopic elements. The macroscopic effect can be the result of a plurality of identical, similar, or different microscopic responses occurring at one or more timescales.

Security document: any document, item or article of manufacture of any importance or value, which might be subject to counterfeit copying. A security document may include features or devices intended to show that the document, item or article is a genuine and legitimate version, and not a counterfeit copy of such a document, item or article. For example, such security documents may include security features such as those disclosed herein. Such security documents may include, but are not limited to, identification documents such as passports, citizenship or residency documents, drivers' licenses, bank notes, coins, cheques, credit cards, bank cards, and other documents, as well as labeling or other security features, for items of monetary value such as designer clothing, accessories, or any other branded products where it is desired to indicate or demonstrate the authenticity or legitimacy of the product compared to a counterfeit copy. Such security features may be permanently or removably incorporated therein depending upon the nature of the document, item or article, and the intended end user.

DETAILED DESCRIPTION OF PREFERRED EMBODIMENTS

FIG. 1 illustrates the general concept of a dynamic transition of a security device (100) in response to an acceleration (3) of the device (100).

A security device (100), comprising microscopic elements (not shown), is placed on side A of a substrate (1). Prior to the acceleration (3) of the device (100), the microscopic elements are in substantial mechanical equilibrium, as exhibited by the initial state (2A) of the security device (100).

The device (100) is subject to an action causing acceleration (3) at time T=0. For example, this action can include shaking, vibrating, throwing, tilting or rotation of the device (100). The device (100) can also be rotated about an axis that is unaligned with the gravitational acceleration field to create a change of orientation of the device with respect to gravity.

At the instant of acceleration (3) (i.e. at T=0), the state exhibited by the device (100) remains practically unchanged. However, as the device (100) undergoes acceleration (i.e. at T>0), the substantial mechanical equilibrium of the microscopic elements is disrupted. That is, the microscopic elements are in a state of mechanical non-equilibrium. Subsequently, the state of the device (100) dynamically continuously transitions as represented by the transitional state (2B).

When the acceleration (3) ceases at $T=T_1$, the security device (100) continues to exhibit a transitional state (2C) since the microscopic elements are still not in substantial mechanical equilibrium.

Some time after the acceleration stops, the microscopic elements re-establish substantial mechanical equilibrium, and the security device (100) exhibits either its original state (2A) or a new state (2D), either of which do not change appreciably, unless the device (100) is subject to another action causing acceleration.

During the sequence of events depicted in FIG. 1, the microscopic elements transition from substantial mechanical equilibrium, to mechanical non-equilibrium, and then back to substantial mechanical equilibrium (some time after the acceleration ceases). For example, in one embodiment, the microscopic elements do not remain aligned with the gravitational field throughout the action of the device, but rather, transition from substantial alignment, to non-alignment, back to substantial alignment with gravity after the acceleration ceases.

The dynamic change in the state of the security device (100) from 2A to 2B to 2C to 2A/2D can lead to visible optical changes, as well as machine-readable or even entirely covert changes (i.e., kept secret by the manufacturer of the security document). The state of a machine-readable security device can, for example, be detected by using a magnetic or electric field; ultraviolet, infrared or visible light; electrical measurements; diffraction patterns; polarization of the transmitted or reflected light; etc. The speed at which the state of the security device (100) changes from 2A to 2B to 2C to 2A/2D can also be tuned to create dynamic changes that persist for some time after the acceleration ceases. The security device can also be subdivided into many independent sub-elements (not shown), each showing various types of dynamic effects at various speeds. The speed at which the various sub-elements are changed can be used to create a unique signature, for example to improve the resistance against counterfeiting or to improve the overtness of the security device.

The timescale of such dynamic visual changes can be, for example, from about 0.01 s to about 100 s, or from about 1 s to about 10 s, or about 5 s, to allow for a rapid and overt visualisation of the dynamic effect. It is, however, understood that the timescale of such dynamic visual change can be tuned depending on the needs of a particular application.

Figure 2:
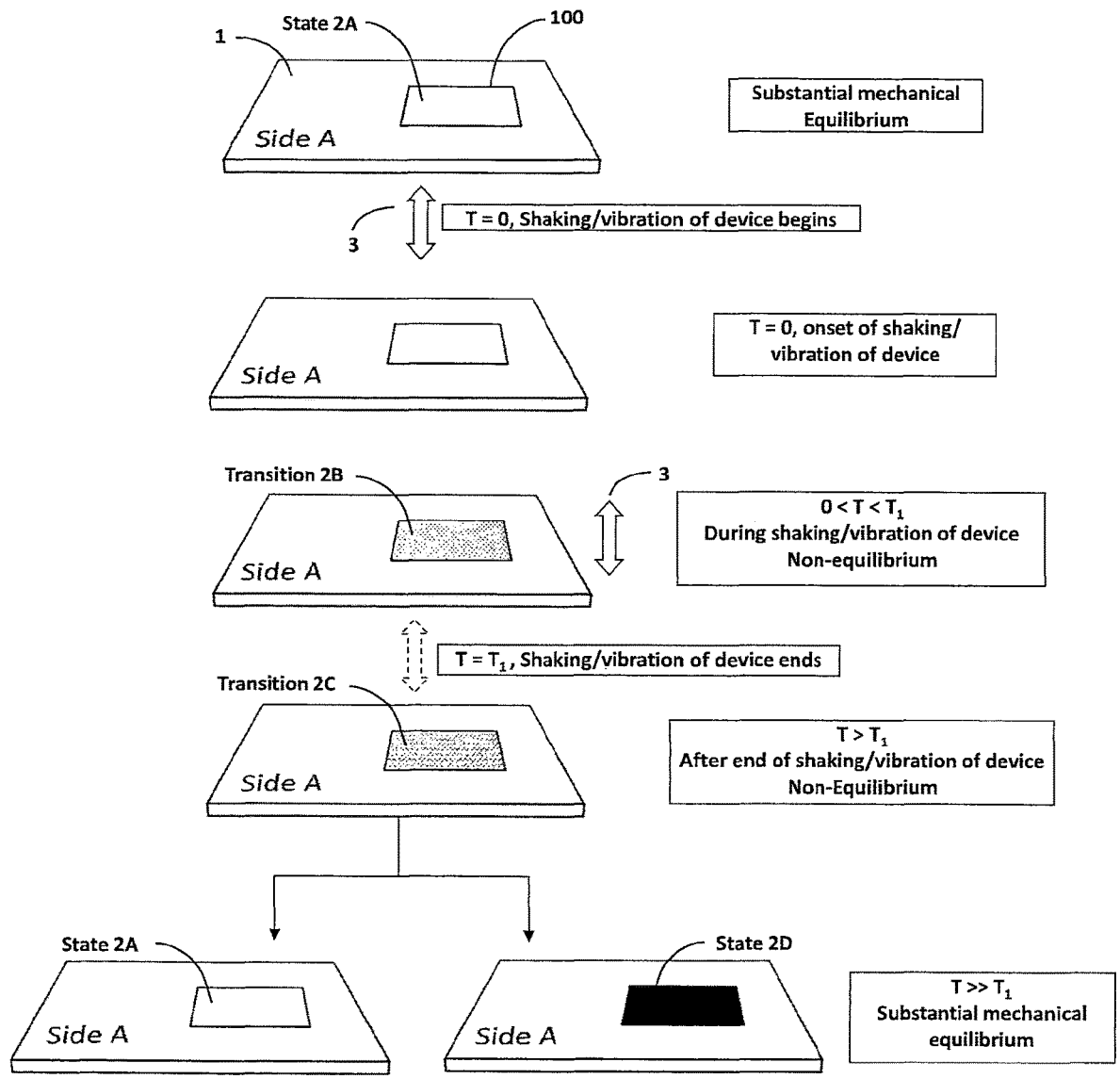
FIG. 2 illustrates the dynamic transition of a security device in response to a rapid variation of the acceleration of the device to create vibrations and/or shaking action.
Figure 3:
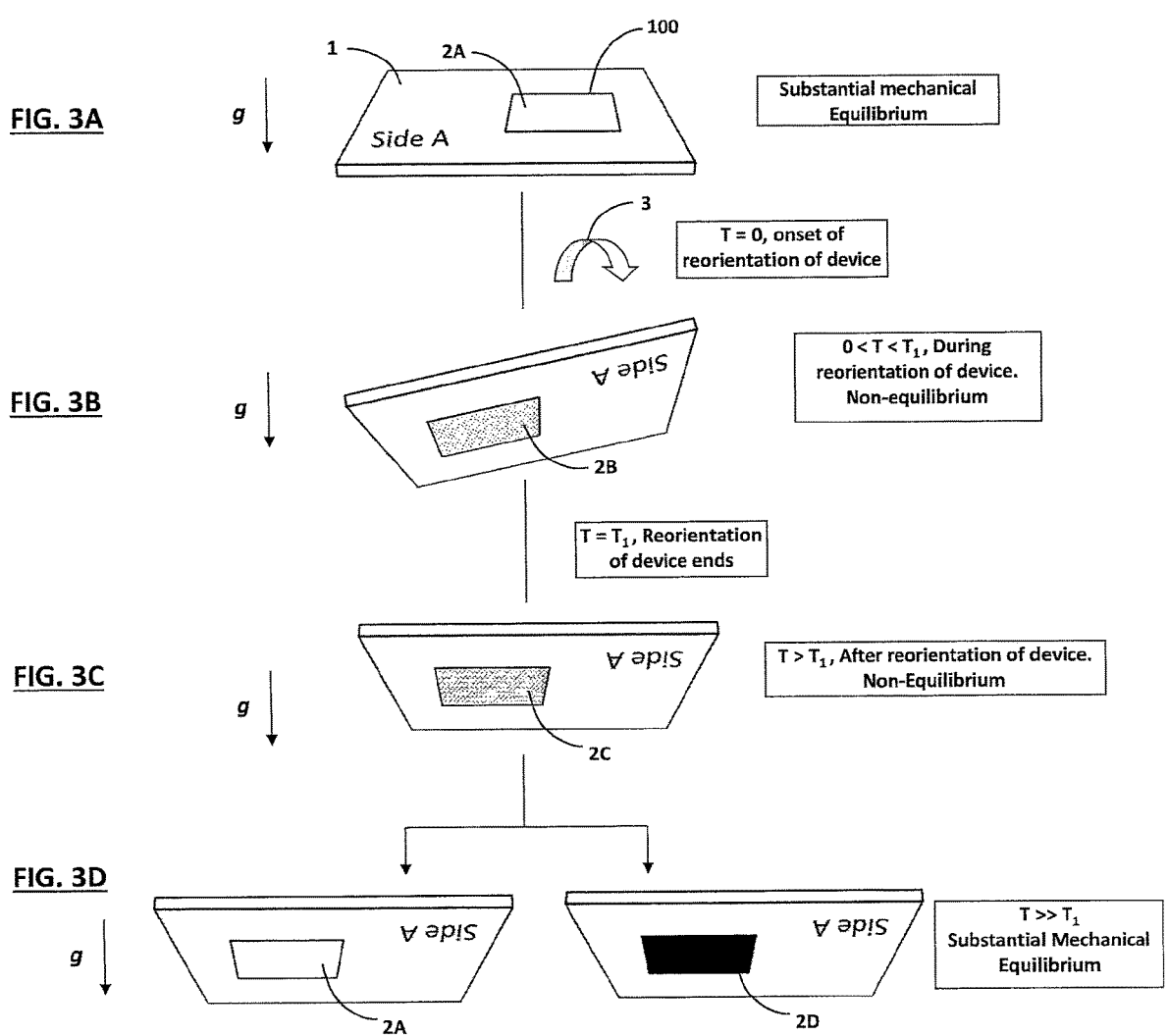
FIGS. 3A-3D illustrate the dynamic transition of a security device in response to flipping the device in the presence of an external gravitational field.

FIGS. 2 to 4 illustrate examples of different types of changes to the device in response to acceleration of the device FIG. 2 shows that changes in the state of the security device (100) from an initial state (2A) to transitional states 2B/2C back to states 2A or 2D can also be triggered by a rapid variation of the acceleration (3) which may, for example, be obtained by shaking or vibrating the security device. Alternatively, the security device can be designed to be activated only by a machine, for example by providing sonic or ultrasonic stimulations. In another example, the security device may be activated by the high acceleration that naturally occurs during high-speed automatic sorting of bank notes. For example, sensors can detect if changes occur to the security device during transport to provide authentication means or to verify if the device is still functional (fitness testing).

In FIG. 2, at the onset of shaking/vibration (at T=0), the security device (100) exhibits a state that is practically the same as initial state (2A). However, once the shaking/vibration is underway (T>0), the microscopic elements are no longer in substantial mechanical equilibrium, and the security device (100) exhibits a transitional state (2B). At the moment when the shaking/vibrating ceases (T=$T_1$), the microscopic elements are still not in substantial mechanical equilibrium, and the security device (100) continues to exhibit a transition state (2C). After some time, (i.e. T>>$T_1$), the microscopic elements return to substantial mechanical equilibrium, and the security device (100) exhibits either state (2A) once again or a new state (2D).

FIGS. 3A-D illustrates an example in which the state of the security device (100) dynamically transitions from 2A to 2B to 2C to 2A/2D by flipping (3) or rotating (3) or reorienting (3) the device about an axis perpendicular to the gravitational field. During the reorientation of the device (100), shown in FIG. 3B, the microscopic elements are now in a state of mechanical non-equilibrium (2B) and begin to revert back to substantial mechanical equilibrium. After the flipping/rotation ceases, the microscopic elements are still in a state of non-equilibrium represented by transitory state 2C (as shown in FIG. 3C). After some time, (i.e. T>>$T_1$), the microscopic elements return to substantial mechanical equilibrium represented by state 2A/2D (as shown in FIG. 3D).

If the substrate is flipped rapidly compared to the response time of the microscopic elements, the transitory state 2C can initially be almost identical to the initial state 2A. This is further illustrated with a practical example in FIG. 4.

FIGS. 4A-4D schematically illustrate an example of a visual effect that results from the dynamic response shown in FIGS. 3A-3D and where the substrate is flipped rapidly compared to the response time of the microelements. In FIG. 4A, a drawing (5) (for example a maple leaf), is clearly visible to an observer (7) placed above the security device (100). On the other hand, an observer (8) placed beneath the security device (100), observes a drawing (6) that appears visibly different from (5), even if the security device (100) is placed on a transparent window. For example, the drawing (5) made by the security device (100) can have a different color or contrast than that of (6). Alternatively, the drawing (6) can be made difficult to observe by observer (8) if its color and contrast match those of the surrounding printed background.

When the security device (100) is changed in orientation with respect to gravity (3), both observers (7) and (8) observe a dynamic change of the image that each is observing.

FIG. 4B, shows the security device after a rapid flipping or reorientation, which is fast compared to the response time of the microscopic elements. Just after flipping, at T~0, observer (7) initially sees the flipped drawing (6), while observer (8) initially sees flipped drawing 5.

In FIG. 4C, shortly afterwards (i.e. T>0), the flipped drawing (5) on side A begins to disappear and has a transient form (5A), while the flipped drawing (6) on side B begins to disappear and has transient form (6A). The microscopic elements that give rise to each image, are in a state of non-equilibrium, as they transition under the action of gravitation.

In FIG. 4D, after substantial mechanical equilibrium of the microscopic elements has been re-established (T>>0), drawing (5) now appears on Side B, as observed by observer (7). Observer (8) now observes drawing (6).

Fabrication of Security Device

Disclosed herein are methods for the fabrication of embodiments of a security device that exhibits dynamic effects in response to acceleration and/or change in orientation with respect to gravity.

Figure 5A:
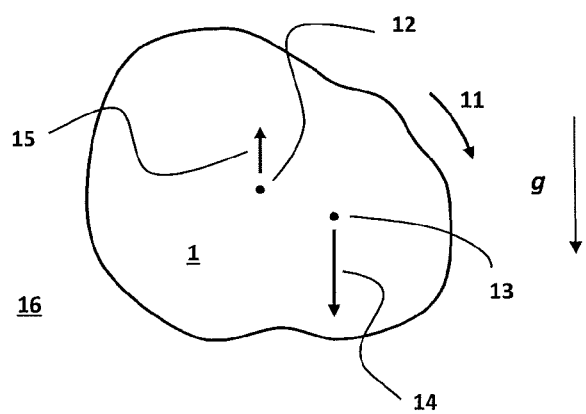
FIGS. 5A-5B each illustrate an example of a gravitational Janus microparticle for use in the fabrication of an embodiment of the security device.

FIG. 5A illustrates various forces on a Janus microparticle (18) suspended in a fluid (16). The Janus microparticle (18) has its center of gravity (13) located at a different position compared to its center of volume (12). This can be achieved, for example, if the Janus microparticle (18) has a non-uniform density, which can be achieved, for example, by making the Janus microparticle from two different materials, or by coating a Janus microparticle with a thin film having a different density, or by creating Janus microparticles with a variable porosity.

When the centers of gravity (13) and volume (12) are distinct, the gravitational and acceleration forces (14) (which are applied at the center of gravity (13)) are generally not aligned with buoyancy and viscous drag forces (15) (which are applied at the center of volume (12)). This leads to a torque (11) that rotates the Janus microparticle (18) until the center of gravity (13) and center of volume (12) are aligned with gravity (g). While a clockwise rotation is shown in FIG. 5A, it is understood that a counter-clockwise rotation is also possible. The rotational speed of the Janus microparticle (18) can be tuned by adjusting characteristics of the device, such as the density distribution within the Janus microparticles, density and thickness of a coating on the microscopic particle, microscopic particle density, liquid viscosity, microscopic particle size, capsule or microfluidic channel size, and the interaction with the sidewalls of the device. The rotation and alignment of a plurality of Janus microparticles (18) with gravitation can then lead to the generation of macroscopic effects that can be observed directly with unaided human eye, or can be detected with a machine.

Figure 5B:
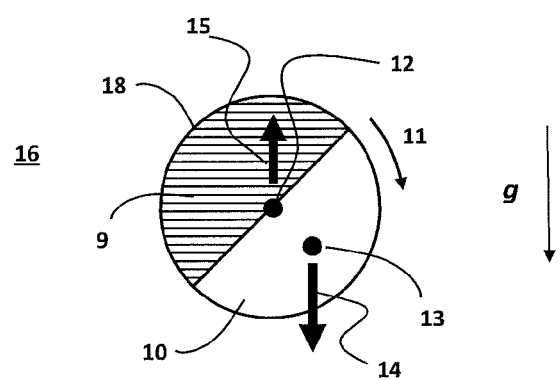

FIG. 5B illustrates one embodiment of a microscopic element, in the form of a gravitational Janus microparticle (18), which is nearly spherical, dispersed in a fluid (16). The Janus microparticle (18) has at least two different types of surfaces (9) and (10), each having different properties. For example, each surface may have different optical properties, (color, absorption, fluorescence, plasmonic signature, reflectance, refractive index, etc.), roughness, magnetic properties, electrical properties, chemical composition, etc. The Janus microparticle (18) also has its center of gravity (13) located at a different position compared with its center of volume (12). This can be achieved, for example, when the Janus microparticle (18) has a non-uniform density, for example by making the Janus microparticle from two different materials, or by coating a portion of the Janus microparticle (18) with a thin film. Alternatively, a Janus microparticle (18) with a non-uniform porosity will also have its center of gravity (13) located at a different position compared with its center of volume (12).

When the centers of gravity (13) and volume (12) are distinct, the gravitational and acceleration forces (14) (which are applied at the center of gravity (13)) are generally not aligned with buoyancy and viscous drag forces (15) (which are applied at the center of volume (12)). This leads to a torque (11) that rotates the Janus microparticle (18) until the center of gravity (13) and center of volume (12) are aligned with gravity (g). While a clockwise rotation is shown in FIG. 5, it is understood that a counter-clockwise rotation is also possible. The rotational speed of the Janus microparticle can be tuned by adjusting characteristics of the device, such as the density distribution within the Janus microparticles, density and thickness of a coating on the microscopic particle, microscopic particle density, liquid viscosity, microscopic particle size, capsule or microfluidic channel size, and the interaction with the sidewalls of the device. The rotation and alignment of a plurality of Janus microparticles (18) with gravitation can then lead to the generation of macroscopic effects that can be observed directly with unaided human eye, or can be detected with a machine.

FIGS. 6A-6D show cross-sections which illustrate an embodiment of a security device, in which microscopic elements (88) are integrated onto a substrate (1). The security device (100) is placed on a substrate (1); the combined security device (100) and substrate (1) is referred to as a document (11). The security device (100) has in an initial state (2A).

The security device (100) consists of one or more chambers or channels (17) filled with a fluid (16) and microscopic elements (88). The fluid (16) can be a non-volatile liquid that evaporates slowly to extend the durability of the devices. The chambers and channels (17) can be designed to create a specific image, for example, a maple leaf as shown in FIG. 4A. Each chamber or channel (17) may contain one or more microscopic element (88). Furthermore, the chambers and channels (17) may be interconnected or may consist of a plurality of independent sections. In addition, one or more different types of microscopic elements (88) can be integrated into the channels and chambers (17), which can then be filled with one or more fluids, for example, to create a variety of dynamic effects.

In this embodiment the microscopic elements (88) can be gravitational Janus particles, having properties as described above. Other types of microscopic elements are possible, examples of which are provided below.

Figure 6:
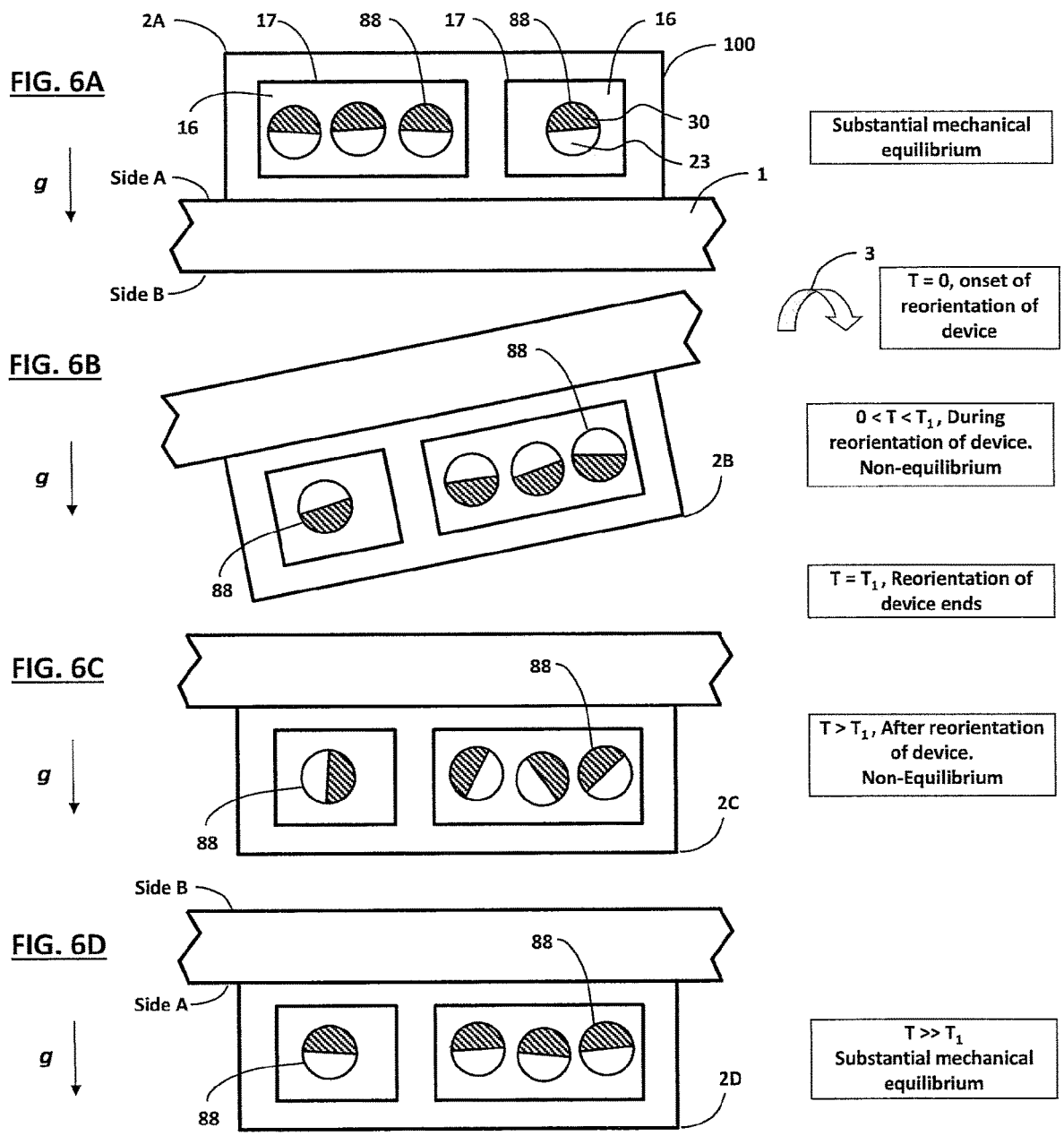
FIG. 6 illustrates an embodiment of the security device.

In FIG. 6A, prior to flipping/rotating, the device (100) exhibits state 2A, in which the microscopic elements (88) are in substantial mechanical equilibrium, such that they are aligned as shown (e.g. shaded portion (30) pointing upward and away from the substrate (1); unshaded portion (23) pointing downward and in direction of the substrate (1)).

When the document (11) is turned over (3) (at T=0), as shown in FIG. 6B, the microscopic elements (88) are also initially turned over, and are in a state of mechanical non-equilibrium. That is, the microscopic elements are now aligned in a state that is not stable (shaded portion (30) below; unshaded portion (23) above). If the reorientation is fast compared to the response time of the microscopic elements, an observer placed under the document would still observe a state 2B which similar to state (2A) of the device, since the shaded portions of the microscopic elements are visible from below.

After the end of the reorientation (at $T>T_1$), in FIG. 6C, the microscopic elements are still in a state of mechanical non-equilibrium and thus rotate or realign in the presence of gravity, in order to eventually re-establish a state of substantial mechanical equilibrium. They may rotate at different or similar rates, giving rise to a transient state 2C. The rotation and realignment of the microscopic elements (88) with gravity gives rise to the dynamic effects discussed previously.

In FIG. 6D, the microscopic elements (88) revert to a state of substantial mechanical equilibrium, such that the shaded portions (30) are aligned above, and the unshaded portions (31) are aligned below. In the case where the microscopic elements (88) are Janus microparticles, the microscopic elements rotate/realign such that the shaded portions are above the non-shaded portion. The device (100) now exhibits a state (2D) where the shaded portion (30) of the microscopic elements is pointing upward and in the direction of the substrate (1) and the unshaded portion (23) is pointing downward and away from the substrate (1)

In one embodiment, the rotation of the microscopic elements (88) gives rise to a color or contrast change observable directly with an unaided human eye. In this embodiment, an observer who looks down on the document on side A in FIG. 6A, observes an image that emanates from the shaded portion of the microscopic elements (state 2A). When the device (100) is flipped, an observer who looks at the document from beneath can observe a state 2B which looks similar to state (2A). However, this image is transitory, as the microscopic elements (88) rotate/realign dynamically to eventually bring the non-shaded portions below the shaded portions. After mechanical equilibrium is reached, the observer below side A will thus observe an image that emanates from the non-shaded portion of the microscopic elements (state 2D).

In yet another embodiment, the substrate (1) is at least partially transparent to enable the observation of the device on each side of the document (11). An observer on either side of the document (11) will observe a dynamic image change, as summarized in FIGS. 4A-4D The microscopic elements (88) may also act as lenses that deviate light so as to change, reveal or magnify a static printed device. Alternatively, complex devices may be patterned directly on the microscopic elements (88) to enhance to effect caused by their rotation, realignment or displacement (e.g. via sedimentation or flotation). The light deviation caused by the microscopic elements (88) can then be used to magnify a small section of the devices printed on the microscopic elements (88), potentially giving rise to complex dynamic effects occurring both with the particle rotation and angle of observation. The microscopic elements (88) may also contain either conventional dyes, or even photochromic, thermochromic, or electrochromic dyes to enhance or change the effect of the security device (100). In addition, the interaction of microscopic elements (88) with the sidewalls of the device can be tuned to create various effects. For example, this interaction can be such that only strong acceleration, (e.g. by shaking vigorously) can dislodge the microscopic elements (88) from the sidewall and allow them to rotate so as to create the dynamic effect of the security device (100).

FIGS. 7A-7D illustrates another embodiment of a security device (100). In this embodiment, shown in FIG. 7A, the microscopic elements (88) are first dispersed in a in a liquid-curable material (19), such as, for example, a UV-resin or thermoset polymer. This liquid-curable material (19) is then deposited on the substrate (1), for example, by conventional printing techniques, and cured to create a solid layer. Finally, the solidified layer is exposed to a liquid swelling agent. The swelling agent enters in the solid layer and causes its expansion, which can create a thin liquid layer (16) around each microscopic element (88). The microscopic elements (88) can then rotate compared to the security element to enable the dynamic effects discussed previously.

Figure 7:
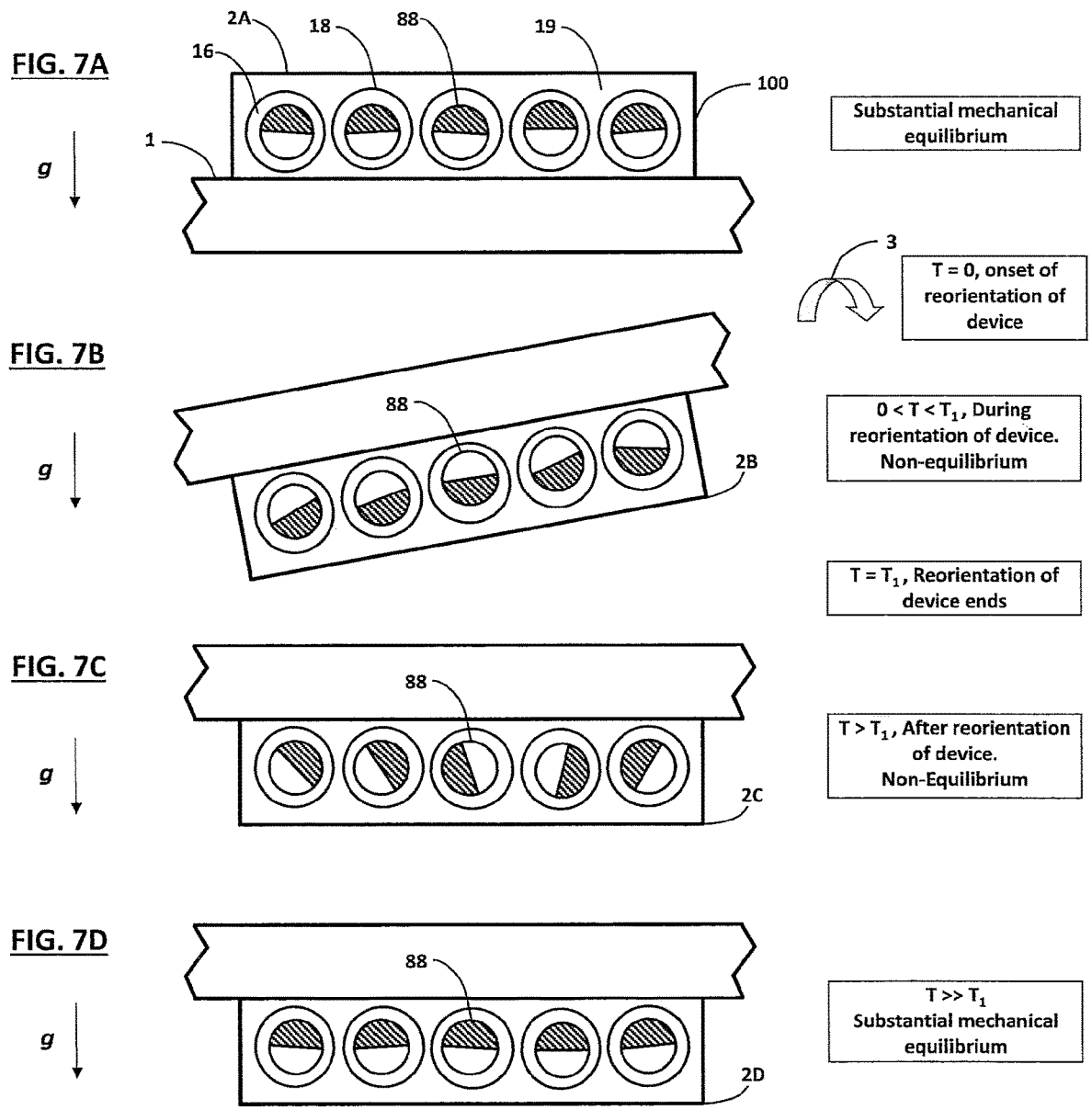
FIG. 7 illustrates another embodiment of the security device.
Figure 8:
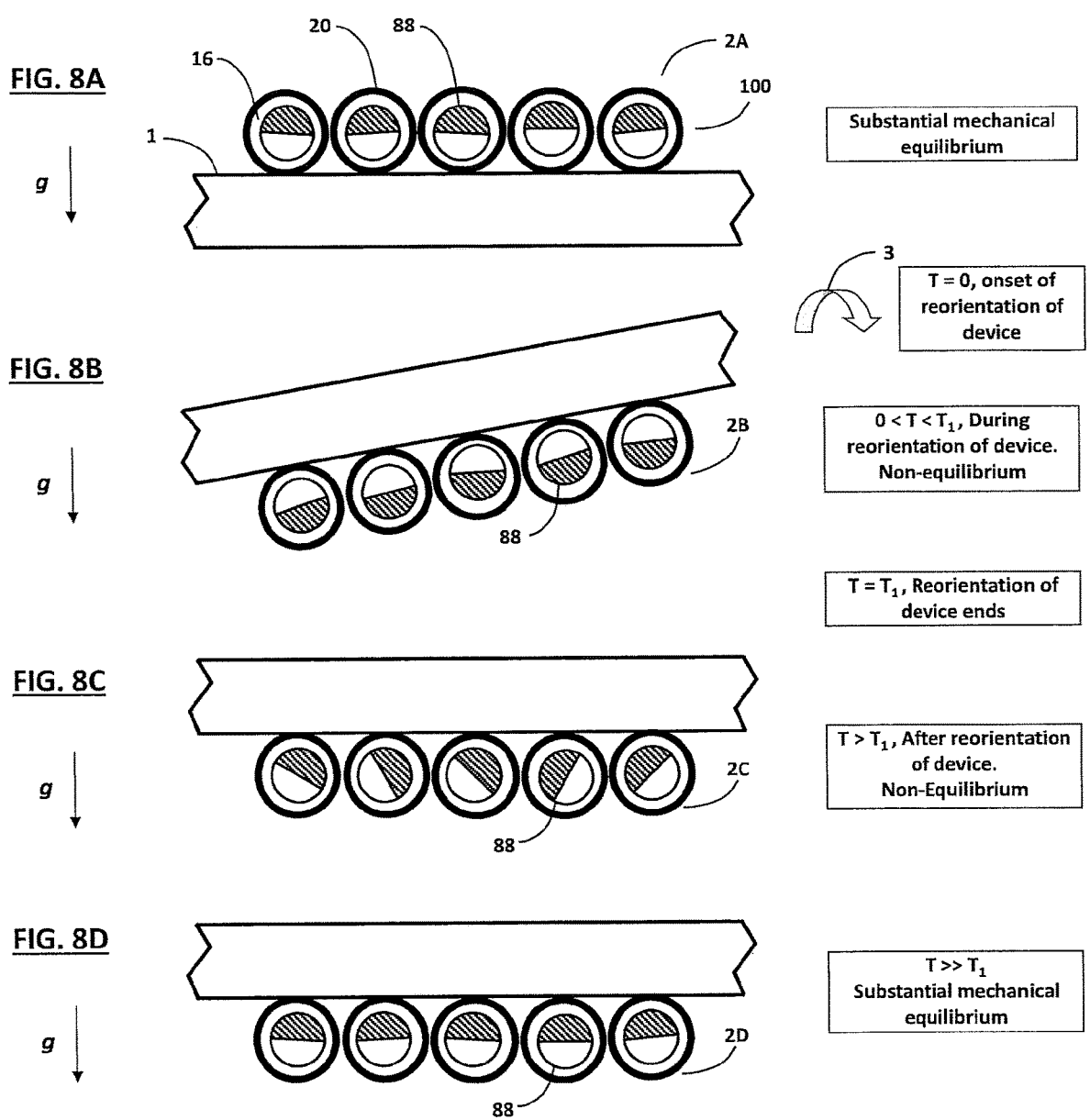
FIG. 8 illustrates another embodiment of the security device.

When the document (11) is rapidly flipped/rotated (3) (at T>0) in FIG. 7B, the microscopic elements (88) are initially following the rotation of the document, thus giving rise to the dynamic effects discussed previously.

FIGS. 8A-8D illustrate another embodiment of a security device (100). In this embodiment, the microscopic elements (88) are encapsulated into larger capsules (20) filled with a liquid (16) which can be non-volatile or have low volatility. The capsules (20) can then be directly deposited into a substrate (1) by conventional printing technique. After printing, the liquid (16) inside each capsule (20) ensures that the microscopic element (88) can rotate compared to the document to create the dynamic effects discussed previously. The curvature of the capsules (20) can also deviate light to create a lens effect that can improve the visual contrast of the dynamic changes caused by the rotation of the microscopic elements (88). More than one particle can be integrated in each capsule (not shown).

FIGS. 9A-9D illustrate how dynamic visual effects can also be generated by the sedimentation of microscopic elements (21) rather than by their rotation. In this embodiment, each microscopic element (21) has an average density that is significantly different than that of the surrounding fluid (16b). If the average density is greater than that of the surrounding fluid (16b), then the microscopic elements (21) will sediment to the bottom of the chamber (17), as shown in FIGS. 9A-9D; if the average density is less than that of the surrounding fluid (16b), then the microscopic elements (21) will float to the top of the chamber (17). The liquid (16b) may contain a dye that partially blocks the light so that the sedimentation of the microscopic elements (21) to the top or bottom of the chamber (17) creates a visual effect.

Alternatively, two types of microscopic elements may be integrated simultaneously in the same chamber (17). These microscopic elements would have respectively a higher and lower density than the liquid (16b) as well as, for example, a different color. Microscopic elements denser than the liquid (16b) would sediment to the bottom of the chamber (17), while the microscopic elements lighter would float to the top of the chamber (17), thus giving rise to visible dynamic effects. As rotation of the microscopic elements (21) is not required for this embodiment, various particle shapes could be more easily used.

Figure 9:
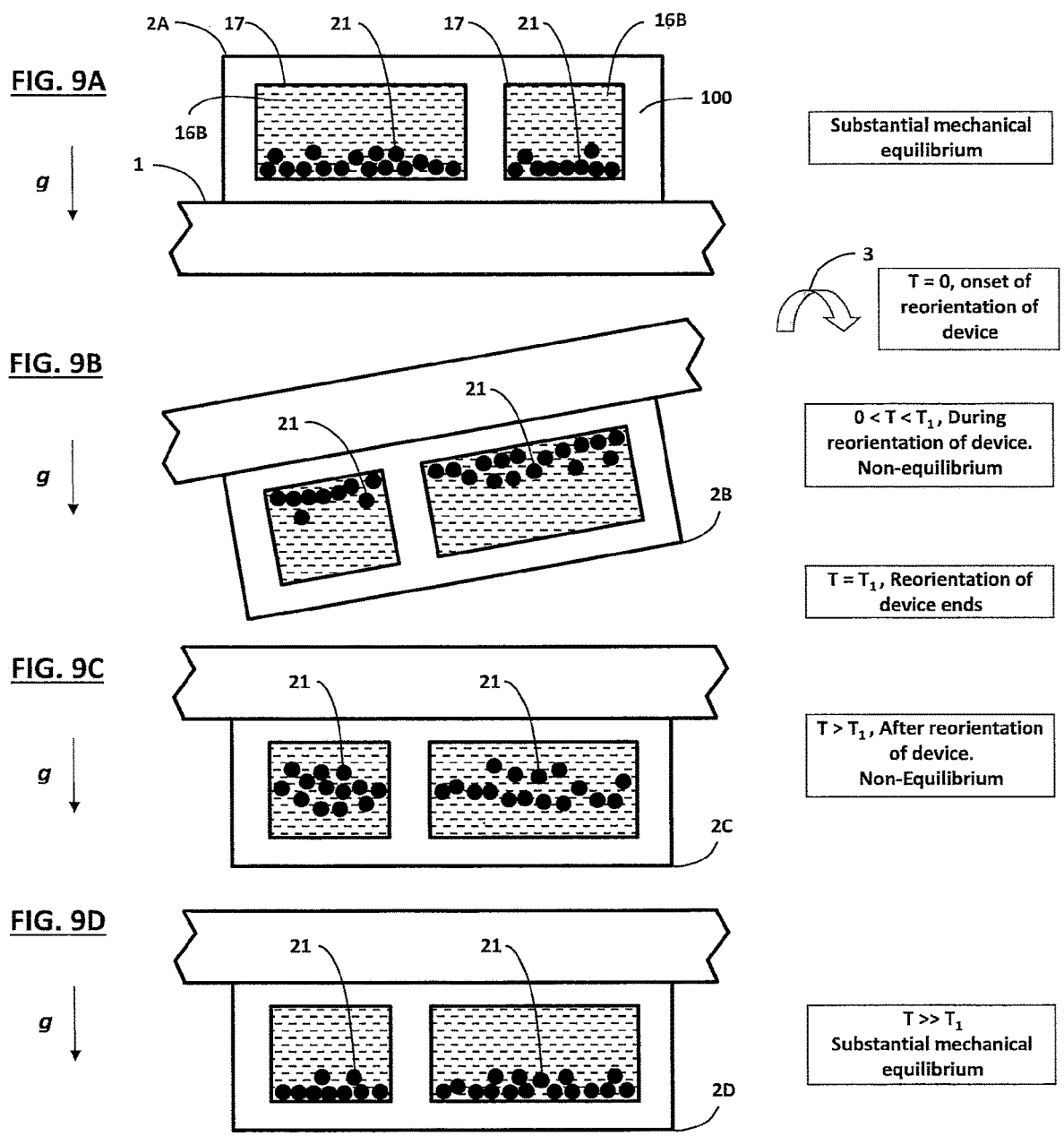
FIG. 9 illustrates another embodiment of the security device based on generation of dynamic visual effects by the sedimentation of microscopic elements.

In FIG. 9A, prior to flipping/rotating, the device (100) exhibits state 2A, in which the microscopic elements (21) have a higher density than the surrounding fluid (16b) and are in substantial mechanical equilibrium, such that they are, for example, sedimented at the bottom of the chamber 17, close to the substrate (1).

When the document (11) is turned over (3) (at T=0), as shown in FIG. 9B, the microscopic elements (21) are also initially turned over, and are in a state of mechanical non-equilibrium. That is, the microscopic elements are in a state that is not stable as they are not at the bottom of the chamber (17) any longer. If the reorientation is fast compared to the response time of the microscopic elements, an observer placed under the document would still observe a state 2B which similar to state (2A) of the device, since, from below, the dyed liquid (16b) is still masking the microscopic elements (21).

After the end of the reorientation (at $T>T_1$), in FIG. 9C, the microscopic elements are still in a state of mechanical non-equilibrium and thus sediment or settle in the presence of gravity, in order to eventually re-establish a state of substantial mechanical equilibrium. They may sediment at different or similar rates, giving rise to a transient state 2C. The sedimentation of the microscopic elements (21) with gravity changes the thickness of the dyed liquid between the microelements and the walls of the chamber (17), which gives rise to the dynamic effects discussed previously.

In FIG. 9D, the microscopic elements (21) revert to a state of substantial mechanical equilibrium and the device (100) now exhibits a state (2D), such that the microscopic elements are sedimented at the bottom of the chamber (17), away from the substrate (1).

FIGS. 10A-10D illustrate another embodiment of a security device based on flotation of microscopic elements (21) incorporated in hollow capsules (20) filled with a liquid (16b). In this example the microscopic elements (21) have a density lower than that of the surrounding fluid (16b). Here, the substrate (1), to which the capsules (20) are attached, is flipped/rotated (3), giving rise to a dynamic effect similar to that described in FIG. 9A-9D, except that the microscopic elements (21) float (or rise), rather than sediment.

Figure 11:
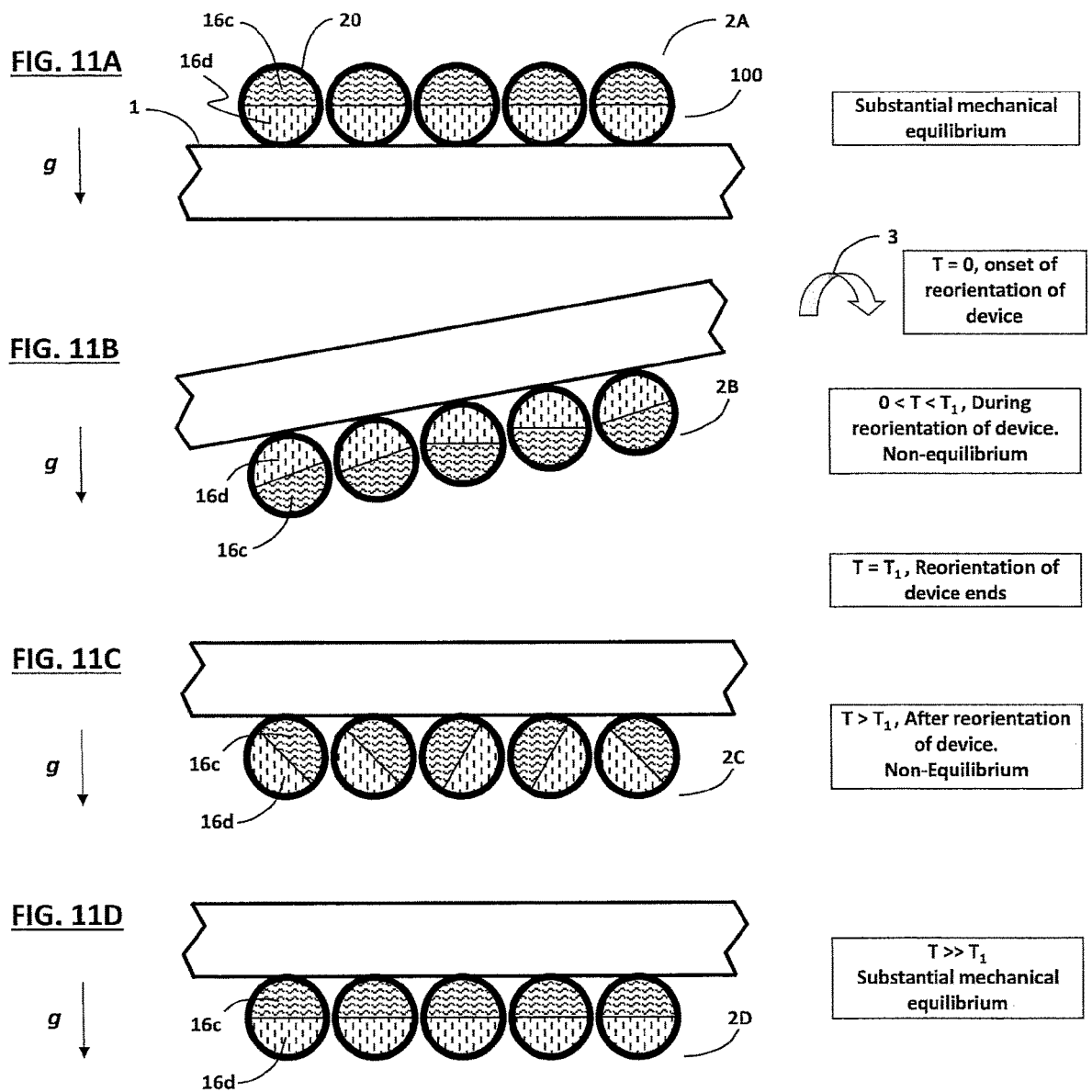
FIGS. 11A-11D illustrate another embodiment of the security device.

FIGS. 11A-11D illustrates another embodiment of a security device, where the microscopic elements (100) comprise hollow capsules (20) that are filled with two different types of immiscible liquids (16c) and (16d), each having a different density. In FIG. 11A, liquid (16c) has a lower density than that of liquid (16d), and the orientation of the microscopic elements (100) is as shown.

In FIG. 11B, the document (11) is flipped/rotated (3), the two liquids (16c, 16d) reverse in orientation. That is, the more dense liquid (16d) is above the less dense liquid (16c). This leads to non-equilibrium of the relative positions of the two liquids (16c, 16d). The density difference between the two liquids (16c) and (16d) leads to continuous displacement of the two liquids (16c) and (16d), as shown in FIG. 11C. These liquids (16c, 16d) revert to a state of substantial mechanical equilibrium (i.e. the less dense liquid (16c) on top the more dense liquid (16d)), as shown in FIG. 11D.

Figure 12:
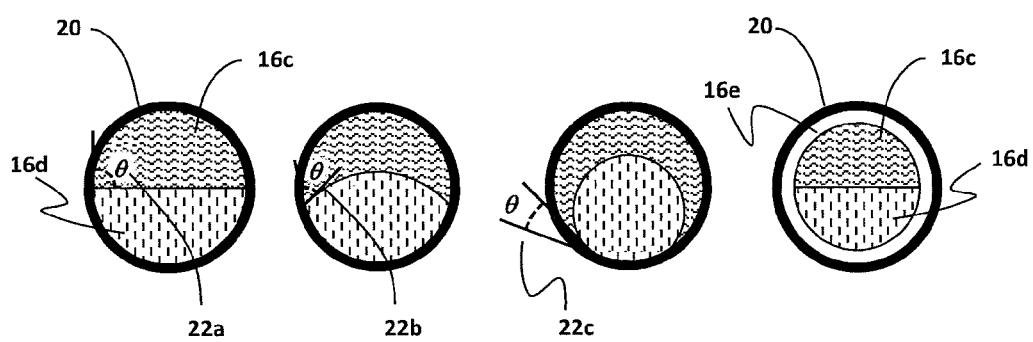
FIG. 12 illustrates different strategies to facilitate displacement of two immiscible liquids used in the embodiment shown in FIGS. 11A-D.

In such an embodiment of the security device, various friction forces, such as contact angle hysteresis, can impede or block the displacement of the two liquids (16c) and (16d) as they attempt to revert to the equilibrium position of FIG. 11D. For example, it is known in the art that gravitational force may not be sufficient to move a liquid placed in a microscopic channel FIG. 12 illustrates different strategies that can be used to facilitate such liquid displacement. For example, the contact angles (22a), (22b) and (22c) of two liquids (16c) and (16d) with a capsule (20) can be modified to minimize such friction forces. Configurations such as (22c) (where one of the liquid has a very high contact angle and the other liquid has a very low contact angle with the capsule) are preferred to minimize contact angle hysteresis friction forces. Alternatively, a third immiscible liquid (16e) that strongly wets the material of the capsule (20) can be used to further minimize contact angle hysteresis friction forces.

It is also understood that combinations of the different types of microscopic elements can be used to fabricate security devices. For example, gravitational Janus microparticles can be integrated into a channel containing two liquids, with each liquid having a different density. The Janus microparticles can, for example have coatings such that one side is preferably wetted by the first liquid, while the other side is wetted by the second liquid. The displacement of the two fluids following a change in acceleration forces the rotation of the Janus microparticles and gives rise to dynamic effects.

The security devices described above can be integrated into security documents using techniques known in the art. For example, the device can be printed, applied as patch or foil or as a laminate or thread. Alternatively, the device can be integrated into the bulk of the security document, for example, or embedded in the substrate of a bank note.

With reference to FIGS. 5 and 6A-6D, one can use microscopic elements that have an average diameter or size between 0.1 µm-100 µm, or between 0.1 µm-50 µm, or between 0.1 µm-10 µm, as long as the size of the microscopic element is less than the thickness of the security device. For example, the thickness of the security device can be typically between 0.1 and 20 µm, or between 1-10 µm.

As an example, Janus microparticles having a diameter of less than 10 µm can be used as part of a security device having a thickness of 10 µm.

Figure 13:
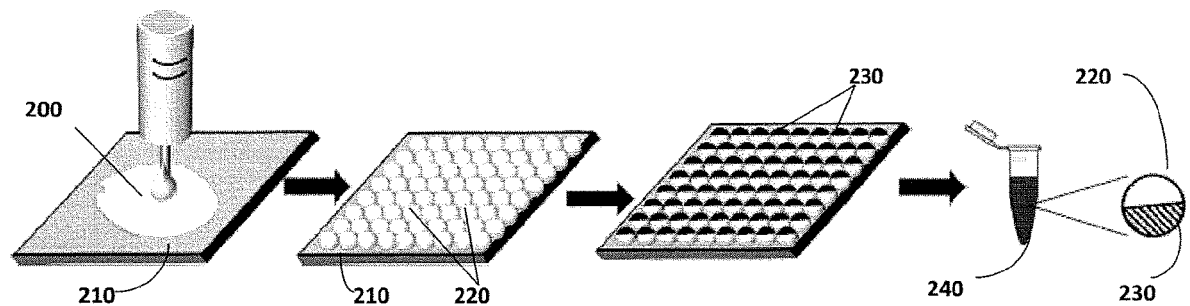
FIG. 13 illustrates a process for the fabrication of Janus microparticles.

A process for the fabrication of the Janus microparticles is illustrated in FIG. 13. The fabrication process begins with commercially-available micron size particles (in the range of 0.7 to 10 µm in diameter). As an example, polystyrene microparticles doped with a conventional or fluorescent dye can be used to enhance the visual contrast generated by the rotation of the final Janus microparticles. The polystyrene microparticles are first dispersed in an aqueous solution (200), deposited on a substrate (210) and left to dry. As known in the art, the drying process can create a self-assembled monolayer of microparticles (220) on the substrate (210). After drying, the microparticles (220) are coated with a thin film (230) using a physical vapor deposition process (for example, e-beam evaporation). The high packing density of the microparticles (220) on the substrate (210) ensures that the thin film (230) is made preferentially on one side of the microparticle surface, thus giving rise simultaneously to a non-uniform density and optical contrast used in a number of the embodiments of the security device.

Many types of coatings can be used. In its most basic form, a thin film (230) (or coating) can consist of a high-density film having a thickness of about 100 nm. The density of the film is higher than the density of the core of the microparticle. Materials, such as metals, can serve as coatings; for example a thin film of gold or tungsten may be used. In addition, a thin-film coating that prevents the reflection of the light off of multiple Janus microparticles, improves the visible contrast generated by the rotation of Janus microparticles in response to gravitation and acceleration. Thus, thin-film coatings have been developed that can simultaneously (i) provide a density difference required for the gravitational orientation of the Janus microparticle and (ii) generate an anti-reflective dark layer. An example of such a coating is a thin film of successive layer of chromium (2 nm)-gold (100 nm)-chromium (2 nm)-silicon dioxide (80 nm)-chromium (10 nm)-silicon dioxide (80 nm). The 2 nm thick chromium films serve as adhesion layers; the gold layer creates the high density coating necessary to ensure fast rotation of the Janus microparticles; and the $SiO_2$—Cr—$SiO_2$ layers create an anti-reflective dark coating.

After deposition of the coating, the Janus microparticles (220) are dispersed in a liquid (240) by sonication. The Janus microparticles can be dispersed in many solvents, such as aqueous solutions, oils, organic solvents, thermoset pre-polymers, UV curable lacquers, etc. For some embodiments of the security device, liquids with a low evaporation, low vapor pressure, low viscosity, low toxicity, high boiling point and low melting point can be used. As a final optional step, the Janus microparticles concentration can be adjusted by centrifugation or other techniques known in the art.

Figure 14:
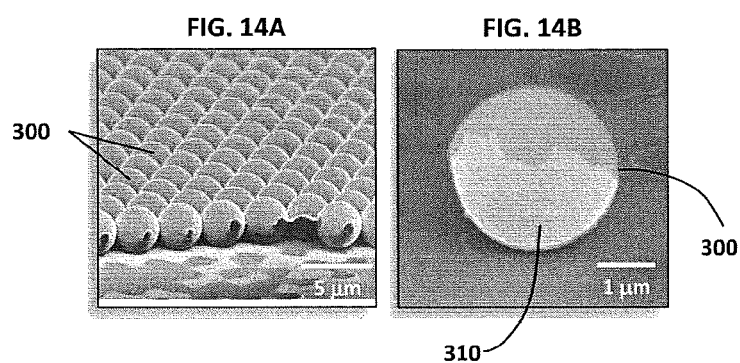
FIG. 14 illustrates scanning electron microscopy (SEM) micrographs of 3 μm diameter Janus microparticles fabricated using the process shown in FIG. 13.

FIGS. 14A-14B illustrate scanning electron microscopy (SEM) micrographs of 3 µm diameter Janus microparticles (300) fabricated with the process described above. FIG. 14A illustrates the Janus microparticles (300) before dispersion; and FIG. 14B illustrates a Janus microparticle (300) after dispersion. In these SEM images, the 100 nm thick gold coating is visible in FIG. 14B due to its brighter contrast. FIG. 14A shows the spatial arrangement of the microparticles (300) after the drying and coating steps. FIG. 14B shows that the coating (310) covers roughly half of the microparticle (300). The microparticle (300) shape remains nearly spherical even after the coating deposition.

Figure 15:
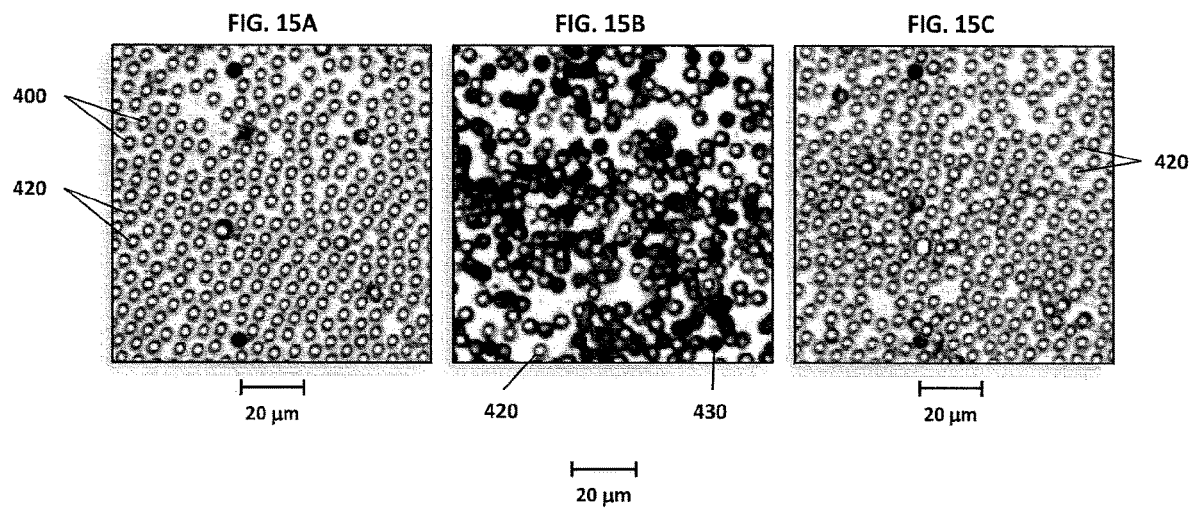
FIG. 15 illustrates a sequence of optical micrographs of 5 μm diameter Janus microparticles dispersed in a fluid and fabricated using the process described in FIG. 13 showing rotation and gravitational alignment of the particles following a perturbation of the fluid.

FIGS. 15A-C illustrates optical micrographs of 5 µm diameter Janus microparticles (400) fabricated using the process described above, dispersed in an aqueous solution, and placed on a glass plate. The Janus microparticles (400) consist of a polystyrene core doped with a red dye, which has a portion of its surface subsequently covered with the anti-reflective coating described above. FIGS. 15A-C show the Janus microparticles observed from above. FIGS. 15A-C were obtained by extracting only the red component of color images to better highlight particle rotation in grayscale image. Following this conversion, the red side of the particle appears as white or pale gray and the dark anti-reflective coating side of the particles appears as black or dark gray.

In FIG. 15A almost all of the Janus microparticles (400) are aligned with gravitational field such that only the red color (420) is visible from above, hiding the dark anti-reflective coating. FIG. 15B shows the Janus microparticles (400) just after a local perturbation (i.e. acceleration or change in orientation) obtained by mixing the assembly of liquid and Janus microparticles (400). Both the dark (430) and the red (420) sides of the Janus microparticles (400) are visible. FIG. 15C shows the situation about 5 seconds after the perturbation, which demonstrate that the Janus microparticles (400) rotate back to their original orientation only a few seconds after the perturbation—that is, only the red color (420) is visible from above. This demonstrates that the fabricated Janus microparticles (400) of only 5 μm diameter can be successfully oriented by gravitational field in a timescale appropriate for the targeted security applications.

The results of FIGS. 15A-C also illustrate that the Janus microparticles naturally reorganize as a relatively uniform monolayer after perturbation. This arises from the sedimentation of the Janus microparticle with gravitation, combined with random displacements caused by Brownian motion. Sedimentation occurs since the average density of the Janus microparticle is about 2 g/cm$^3$, which is higher than that of the surrounding liquid. The formation of a compact layer of particles can improve the visual contrast generated by their rotation.

Figure 16:
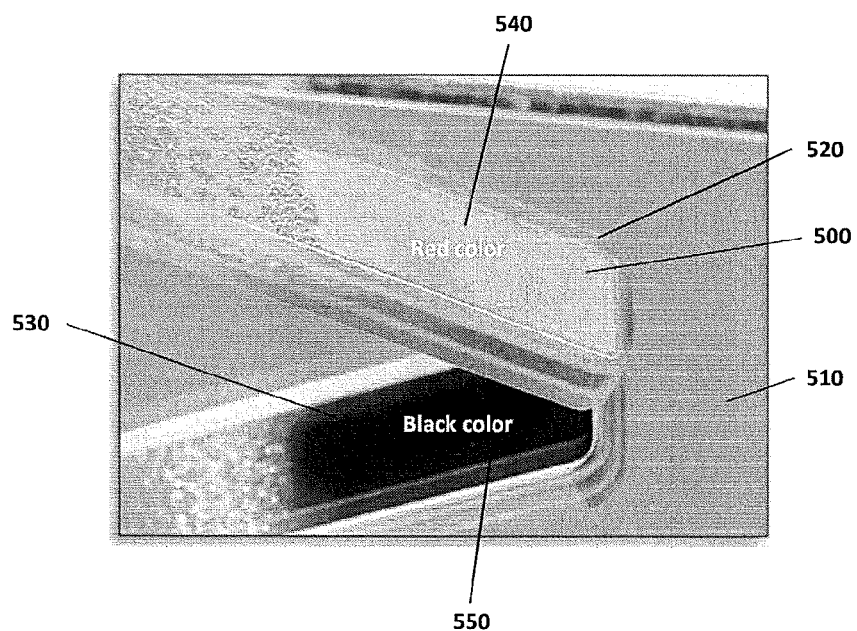
FIG. 16 illustrates the macroscopic visible effect of a solution of Janus microparticles fabricated using the process described in FIG. 13.

FIG. 16 shows the macroscopic visible effect obtained when a solution (500) containing approximately 1% volume concentration of the Janus microparticles shown in FIGS. 15A-C is placed above a mirror (510) in a glass cuvette (520). FIG. 16 was obtained with the same color conversion process as for FIGS. 15A-C. In this image, the gravitational field is pointing downward. The image (530) of the cuvette (520) in the mirror provides a mean for the simultaneous observation of the bottom and top of the liquid solution (500). A clear red (540) and black color (550) contrast is visible between the top and the bottom of the liquid solution (500). The color contrast obtained demonstrates that the gravitational orientation of the particles can give rise to macroscopic effects clearly visible to unaided human eye.

Figure 17:
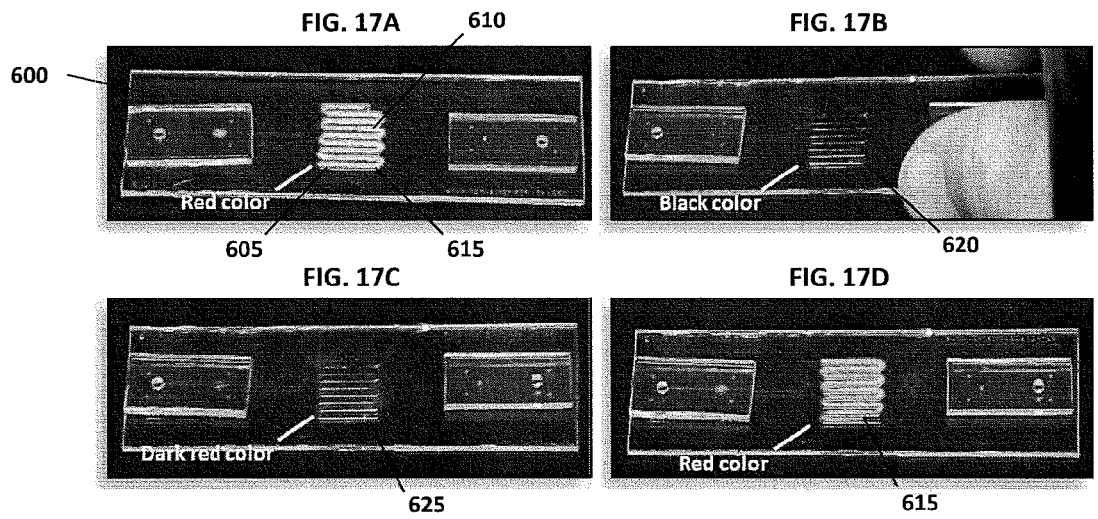
FIG. 17 illustrates a dynamic response obtained by flipping an embodiment of a security device consisting of a channel filled with an aqueous solution of Janus microparticles.

FIGS. 17A-D show the macroscopic dynamic response obtained by flipping a prototype security device (600) consisting of a channel (605) filled with an aqueous solution (610) containing the red and black Janus microparticles shown in FIGS. 15A-C. FIGS. 17A-D was obtained with the same color conversion process as for FIGS. 15A-C and FIG. 16. The amount of Janus microparticles introduced in the channel (605) corresponds to an average thickness of approximately 1.5 monolayers of particles (i.e. about 7.5 microns). In the initial state (shown in 17A), the channel area (605) of the device (600) shows a bright red color (615) despite the limited effective thickness of Janus microparticles. Just after flipping the device (shown in FIG. 17B), the channel (605) shows a black color (620) that contrasts significantly compared with its initial red color (615 in FIG. 17A). In FIG. 17C, about 2 seconds after FIG. 17B, the channel (605) shows a dynamic response (625) where its color is found to gradually and dynamically reverts back to its initial red color (615). In FIG. 17D, five seconds after FIG. 17B, the channel (605) is back to its red color (615), thus demonstrating the gravitationally-induced dynamic visible effects. The effect is clearly visible to unaided human eye in most lightning conditions and from several feet away. Also, in contrast with most OVD known in the art, both the red and black colors obtained are nearly constant with the angle of observation. After several months following fabrication, the devices remain functional with no significant particle attachment to the sidewalls.

FIGS. 18A-D illustrate a time lapse of a dynamic response, in which complex flow profiles arise during the sedimentation of Janus microparticles in a container containing fluid. In this example, the dynamic response includes both sedimentation and rotation (i.e. alignment with the gravitational field). The Janus microparticles are nearly spherical, and have one surface portion that is black, and another surface portion that is red. The black portion of the Janus microparticles is pointing downward after gravitational alignment. FIG. 18A shows the fluid container just after it has been flipped, in which a black color is observed. FIG. 18B shows the same container about 2 s later. Here, the black color quickly reverts back to a red color (lighter shading in FIG. 18B) following gravitational-induced rotation and alignment of the Janus microparticles. FIG. 18C shows the same container about 6 s after FIG. 18A, in which the Janus microparticles group in dendritic-like filaments during sedimentation (FIG. 3c). The sedimentation perturbs the rotation, so that both red and black colors are observed. Formation of such complex patterns is caused by the complex flow profiles that arise from multi-body interactions during sedimentation. FIG. 18D shows the dynamic response about 20 s after FIG. 8A. In FIG. 18D, sedimentation has finished; only red color is observed, confirming the gravitational-induced alignment of the Janus microparticles on the bottom wall of the fluidic container.

Additional Embodiments

1. A security device comprising a plurality of microscopic elements configured to transition from being substantially aligned to being unaligned with the gravitational field upon action of acceleration or a change of orientation of the device, and back to being aligned with the gravitational field after cessation of the acceleration or change of orientation.
2. The security device as described in additional embodiment 1, wherein the transition from being substantially aligned to not being aligned and back to being aligned with the gravitational field produces one or more macroscopic effects.
3. The security device as described in additional embodiment 2, wherein at least one of the macroscopic effects is optical.
4. The security device as described in additional embodiment 3, wherein the optical macroscopic effect is visually observable by an unaided human eye.
5. The security device as described in additional embodiment 4, wherein the optical macroscopic effect is machine readable.
6. The security device as described in any one of additional embodiments 1 to 5, wherein the plurality of microscopic elements transitions from substantial alignment to unalignment and back to alignment in a time interval of about 0.01 s to about 100 s, 0.01 to 10 s, or 1 s to 10 s.
7. The security device as described in any one of additional embodiments 1 to 6, wherein the acceleration is vibration and/or shaking of the security device.
8. The security device as described in any one of additional embodiments 1 to 7, wherein the microscopic elements vary in size between 0.01 and 100 microns.
9. The security device as described in additional embodiment 8, wherein the microscopic elements vary in size between 0.01 and 10 microns.
10. The security device as described in any one of additional embodiments 1 to 9, wherein the microscopic elements are integrated into one or more microchannels.
11. The security device as described in additional embodiment 10 comprising a plurality of independent microchannels.
12. The security device as described in additional embodiment 10 or 11, wherein each microchannel has a height of between 0.1 and 1000 microns.
13. The security device as described in any of additional embodiments 1 to 12, wherein the microscopic elements are dispersed in fluid; a portion or all of the microscopic elements each have a centre of mass that is distinct from the centre of volume; and the microscopic elements transition by way of rotation.

14. The security device as described in additional embodiment 13, wherein rotation of the microscopic elements deviates light to change, reveals or magnifies one or more static printed features patterned on the microscopic elements.

15. The security device as described in additional embodiment 13 or 14, wherein the microscopic elements and fluid are integrated into one or more microcapsules having a diameter of between 0.1 and 200 microns (μm).

16. The security device as described in any one of additional embodiments 1 to 12, wherein the microscopic elements comprise two or more immiscible fluids of unequal density, and the microscopic elements transition by way of displacement of the fluids within the element.

17. The security device as described in additional embodiment 16, wherein the microscopic elements comprises the two or more fluids integrated into one or more microcapsules having a diameter of between 0.1 and 200 microns (μm).

18. The security device as described in additional embodiment 17, wherein the each microcapsule comprises a first and a second liquid.

19. The security device as described in additional embodiment 18, wherein the first liquid has a contact angle higher than 140 degree with the microcapsule and the second liquid has a contact angle lower than 40 degree with the microcapsule.

20. The security device as described in additional embodiment 17, wherein each microcapsule comprises a first, second and third fluid; the first fluid wets an inner surface of the microcapsule, and the second and third fluids are encapsulated by the first fluid.

21. The security device as described in any one of additional embodiments 17 to 20, wherein the microscopic elements or microcapsules are deposited, printed, attached or added onto or into a substrate.

22. The security device as described in any one of additional embodiments 17 to 24, wherein the microcapsule and/or fluid deviate light to create a lens effect.

23. The security device as described in additional embodiment 1, wherein the microscopic elements are dispersed in a liquid matrix that is solidified; and the solidified matrix is exposed to a swelling agent that provides a liquid shell around the microscopic elements.

24 The security device as described in additional embodiment 23, wherein the liquid matrix is solidified by curing or solvent evaporation.

25. The security device as described in additional embodiment 1, wherein different types of microscopic elements are used to provide one or more responses.

26. The security device as described in any one of additional embodiments 1 to 24, wherein the microscopic element is a Janus microparticle comprising: i) an inner core; and ii) a coating on a surface portion of the Janus particle, and the inner core has a density distinct from a density of the coating.

27. The security device as described in additional embodiment 26, wherein the inner core has a diameter of from 0.1 to 100 microns (μm), the coating has a thickness of from 10 nm to 500 nm and the coating thickness is less than 20% of the diameter.

28. The security device as described in additional embodiment 27, wherein the inner core is solid.

29. The security device as described in any one of additional embodiments 26 to 28, wherein the coating has an anti-reflective surface.

30. The security device as described in additional embodiment 29, wherein the coating comprises chromium, gold and silicon dioxide.

31. The security device as described in additional embodiment 30, wherein the coating comprises a first layer of chromium on the surface portion of the inner core; a second layer of gold; a third layer of chromium; a fourth layer of silicon dioxide; a fifth layer of chromium and a sixth layer of silicon dioxide.

32. The security device as described in any one of additional embodiments 26 to 28, wherein the coating comprises a thin film, a dye or a colorant.

33. The security device as described in additional embodiment 32, wherein the thin film comprises a first layer of one or more metal films, a second layer of a first dielectric film, a third layer of one or more metal films, and fourth layer of a second dielectric film.

It will be appreciated by persons skilled in the art that the foregoing disclosure constitutes a description of specific embodiments showing how the security device may be applied and put into use. These embodiments are only exemplary and are not meant to limit the disclosure to what has been particularly shown and described herein above. A variety of modifications and variations are possible in light of the above teachings without departing from the scope of the present disclosure. The security device is further described and defined in the claims which now follow.

We claim:

1. A security device that exhibits at least one dynamic response upon change of orientation of the security device with respect to gravity, wherein:
   the security device comprises one or more microfluidic chambers filled with a liquid and one or more microscopic elements; and
   the dynamic response:
     a) continues after cessation of the change of orientation with respect to gravity; and
     b) comprises a transition of the one or more microscopic elements:
       i) from substantial mechanical equilibrium to non-equilibrium upon action of the change of orientation with respect to gravity; and
       ii) back to substantial mechanical equilibrium after cessation of the change of orientation with respect to gravity, and
   wherein the one or more microscopic elements undergo at least one of a rotational motion and a translational motion relative to the liquid during the transition, and the volumetric space collectively occupied by the liquid and the one or more microscopic elements is unchanging relative to the rest of the security device throughout the dynamic response.

2. The security device of claim 1, wherein the transition leads to the generation of one or more macroscopic effects.

3. The security device of claim 2, wherein at least one of the macroscopic effects is optical.

4. The security device of claim 3, wherein the optical macroscopic effect is visually observable by an unaided human eye.

5. The security device of claim 2, wherein at least one macroscopic effect is machine readable.

6. The security device of claim 1, wherein the one or more microscopic elements transitions from substantial mechanical equilibrium to non-equilibrium and back to substantial mechanical equilibrium in a time interval of from about 0.01 s to about 100 s, preferably from about 0.01 s to about 10 s, more preferably from about 1 s to about 10 s.

7. The security device of claim 1, wherein the one or more microscopic elements have a size between 0.01 and 100 µm, preferably between 0.01 and 10 µm.

8. The security device of claim 1, wherein the one or more microscopic elements are integrated into a plurality of independent microchambers.

9. The security device of claim 1, wherein:
   at least a portion of each of the one or more microscopic elements has an average density that is unequal with the liquid's density; and
   the one or more microscopic elements transition by way of sedimentation or flotation.

10. The security device of claim 1, wherein the one or more microscopic elements are dispersed in a liquid matrix that is solidified; and the solidified matrix provides a plurality of microfluidic chambers that are subsequently exposed to a swelling agent that provides the liquid as a shell around the one or more microscopic elements.

11. The security device of claim 10, wherein the liquid matrix is solidified by curing or solvent evaporation.

12. The security device of claim 9, wherein the one or more microscopic elements comprises: a first set of microscopic elements each with an average density greater than the liquid density that transition by way of sedimentation; and a second set of microscopic elements each with an average density less than the liquid density that transition by way of flotation.

13. The security device of claim 9, wherein the liquid comprises a dye that contrasts with the one or more microscopic elements as they transition by way of sedimentation or flotation.

14. The security device of claim 1, wherein the one or more microscopic elements are configured to transition from substantial alignment to non-alignment with the gravitational field upon action of the change of orientation of the device, and back to substantial alignment with the gravitational field after cessation of the change of orientation.

15. The security device of claim 14, wherein the one or more microscopic elements are dispersed in the liquid; a portion or all of the microscopic elements each have a centre of mass that is distinct from a centre of volume thereof; and the microscopic elements transition by way of rotation.

16. The security device of claim 14, wherein the one or more microscopic element is a Janus microparticle comprising: i) an inner core; and ii) a coating on a surface portion of the Janus particle, and the inner core has a density distinct from a density of the coating.

17. The security device of claim 16, wherein the inner core has a diameter of from 0.1 to 100 µm, the coating has a thickness of from 10 nm to 500 nm and the coating thickness is less than 20% of the diameter.

18. The security device of claim 1, wherein the dynamic response is generated with no external equipment required.

* * * * *